(12) United States Patent
Deguchi et al.

(10) Patent No.: US 6,480,202 B1
(45) Date of Patent: Nov. 12, 2002

(54) IMAGE PROCESSING DEVICE AND METHOD, IMAGE TRANSMISSION/RECEPTOR SYSTEM AND METHOD, AND PROVIDING MEDIUM

(75) Inventors: Tatsuya Deguchi, Kanagawa; Naoya Kato, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/331,880

(22) PCT Filed: Nov. 2, 1998

(86) PCT No.: PCT/JP98/04961

§ 371 (c)(1),
(2), (4) Date: Aug. 9, 1999

(87) PCT Pub. No.: WO99/23637

PCT Pub. Date: May 14, 1999

(30) Foreign Application Priority Data

Oct. 31, 1997 (JP) .............................. 9-301191

(51) Int. Cl.⁷ .......................... G09G 5/02; H04N 17/00; G06K 9/00; G03F 3/08
(52) U.S. Cl. ....................... 345/600; 348/179; 382/167; 358/518
(58) Field of Search ................................. 345/153, 150, 345/154, 600, 603, 589; 382/167, 274; 358/504, 518; 348/602, 603, 179, 655

(56) References Cited

U.S. PATENT DOCUMENTS

| | | | | | |
|---|---|---|---|---|---|
| 5,115,229 A | * | 5/1992 | Shalit | ........................... | 324/404 |
| 5,309,257 A | * | 5/1994 | Bonino et al. | ............... | 358/504 |
| 5,479,186 A | * | 12/1995 | McManus et al. | ............. | 345/11 |
| 5,479,189 A | * | 12/1995 | Chesavage et al. | ......... | 345/154 |
| 5,502,458 A | * | 3/1996 | Braudaway et al. | ........ | 345/153 |
| 5,528,339 A | * | 6/1996 | Buhr et al. | .................... | 355/32 |
| 5,555,022 A | * | 9/1996 | Haruki et al. | ................ | 348/223 |
| 5,606,432 A | * | 2/1997 | Ohtsuka et al. | ............. | 358/527 |
| 5,614,925 A | * | 3/1997 | Braudaway et al. | ........ | 345/153 |
| 5,754,682 A | * | 5/1998 | Katoh | ......................... | 382/162 |
| 5,757,438 A | * | 5/1998 | Yoon et al. | .................. | 348/603 |
| 5,821,917 A | * | 10/1998 | Cappels | ....................... | 345/150 |
| 5,926,213 A | * | 7/1999 | Hafele et al. | ................ | 348/223 |
| 5,956,015 A | * | 9/1999 | Hino | ........................... | 345/153 |
| 6,072,902 A | * | 6/2000 | Myers | ......................... | 382/167 |
| 6,075,888 A | * | 6/2000 | Schwartz | ....................... | 7/382 |
| 6,081,254 A | * | 6/2000 | Tanaka et al. | ............... | 345/154 |
| 6,088,038 A | * | 7/2000 | Edge et al. | .................. | 345/431 |
| 6,091,518 A | * | 7/2000 | Anabuki | ..................... | 358/500 |
| 6,160,644 A | | 12/2000 | Lin | ............................. | 358/518 |
| 6,236,474 B1 | | 5/2001 | Mestha et al. | .............. | 358/520 |
| 6,240,204 B1 | * | 5/2001 | Hidaka et al. | .............. | 382/167 |

FOREIGN PATENT DOCUMENTS

| | | |
|---|---|---|
| EP | 0 785 672 | 7/1997 |
| JP | 2-109396 | 8/1990 |
| JP | 6-105331 | 4/1994 |
| JP | 8-115067 | 5/1996 |
| JP | 10 336467 | 12/1998 |

\* cited by examiner

Primary Examiner—Michael Razavi
Assistant Examiner—Ryan R Yang
(74) Attorney, Agent, or Firm—Frommer Lawrence & Haug LLP; William S. Frommer; Glenn F. Savit

(57) ABSTRACT

Information on ambient light (viewing environment information) input from ambient light input section 101 is fed to viewing environment converting section 100a, which determines measured color values of monitor 103, and then fed to profile updating section 100b and contrast correcting section 100d. The contrast correcting section 100d corrects the contrast according to the measured color values. Information on the setting of the monitor 103 fed from monitor control section 102 is supplied to monitor setting values converting section 100c, where TRCs and a matrix are generated according to the modified setting information and supplied to the profile updating section 100b. The profile updating section 100b updates the profiles stored in memory 104a by means of newly generated profiles.

15 Claims, 19 Drawing Sheets

IMAGE PROCESSING DEVICE AND METHOD, IMAGE TRANSMISSION/RECEPTOR SYSTEM AND METHOD, AND PROVIDING MEDIUM

TECHNICAL FIELD

This invention relates to an apparatus and a method for processing images and a system and a method for transmitting and receiving images as well as a providing medium that are particularly adapted to carry out color signal processing operations that may vary as a function of individual image display apparatus in order to coordinate the colors of images to be displayed there so as to eliminate apparatus-dependency of the colors of images.

BACKGROUND ART

As a result of the rapid spread of DTP (desk top publishing) and the Internet in recent years, color images are manipulated more often than ever on the display screens of CRT (cathode ray tube) displays and liquid crystal displays.

For example, operations of drawing pictures by means of painting tools are being replaced by those of drawing computer graphics by means of personal computers. Consumers place orders by seeing images of products displayed on the display screen as electronic advertisements that are transmitted by way of the Internet.

In any of such cases, it is necessary that the colors of the original picture (which may be a picture drawn by an artist or a photographic picture) and those of the facsimile image of the picture output by an apparatus (which may be the monitor screen of a display apparatus or a color printer) agree with each other.

Thus, it is highly desirable that, for a same picture, the image displayed on the display screen of a personal computer and the image output by a printer appear same in terms of their colors.

In the case of an electronic advertisement, if the image of an article (e.g., a jacket or a painting) displayed on the display screen of the personal computer of a consumer appears differently from the actual commodity, a trouble may arise between the commodity provider and the consumer when the consumer buys the commodity.

Thus, it is necessary to provide an arrangement in which a picture appears exactly the same on all the image display apparatus displaying an image of the picture particularly in terms of colors.

A system referred to as CMS (color management system) is known for correcting the differences of colors of images of the same picture among different image display apparatus displaying it.

FIG. 1 of the accompanying drawings schematically illustrate a CMS. Referring to FIG. 1, with a CMS, the color signals of a picture input through an input device (e.g., camera 1, scanner 2, monitor 3) are converted into common color space signals (e.g., CIE/XYZ, CIE/L*a*b*) that are not dependent on the characteristics of the device and then output through an output device (e.g., monitor 3, printer 4).

A conversion formula or a conversion table that is referred to as "profile" and specific to each device is used when converting a signal into that of a common color space. For examples, the color signals of a picture taken by camera 1 are converted into common color space signals by the profile specific to the camera 1. To output the signals through monitor 3, the common color space signals are then converted into color signals that reflect the characteristics of the monitor 3 by the profile specific to the monitor 3 and an image of the picture formed by the obtained color signals will be displayed on the monitor.

Such a profile is determined by means of the signal values input to the device and the color values (XYZ values or L*a*b* values) obtained by observing the colors of the image output according to the signal values typically through a calorimeter.

FIG. 2 of the accompanying drawings a chart showing the flow of data when the image on the monitor 3 is output to printer 4. Referring to FIG. 2, the image on the monitor 10 is converted into signals of a common color space by the profile specific to the monitor 3 (monitor profile 20). In other words, the image data (RGB data) of the monitor 3 are converted respectively into corresponding quantities of light by means of TRCs (tone reproduction curve, which will be described hereinafter) generated by TRC generator section 20-1. The quantities of light for RGB reflect the colors of the image viewed by the user on the monitor 3.

The data (on the quantities of light for RGB) generated by the TRC generator section 20-1 are then processed for conversion using a matrix representing the linear relationship between the quantities of light output to the monitor 3 and the CIE/XYZ values (or L*a*b* values) to obtain a series of values (CIE/XYZ values or L*a*b* values), which are then output as common color space signals 30.

The common color space signals 30 obtained by the monitor profile are then processed for conversion by the profile specific to the printer 4 (printer profile 40) to reflect the printing characteristics of the printer 4 and the obtained color signals for the printer, or CMY50, are printed and output.

Apparatus of a same type can show disparity, if slightly, in the characteristics depending on individual apparatus. Then, the profile is preferably calibrated for each apparatus.

The profiles of the monitors marketed by a same manufacturer can be calibrated typically by means of a monitor calibration tool or characterization tool provided by the manufacturer.

The monitor profile 20 is prepared by such a tool. FIG. 3 of the accompanying drawings is a flow chart of the operation of preparing a monitor profile. Referring to FIG. 3, firstly in Step S1, TRCs (g-curves) representing the non-linear relationship between the RGB data to be input to the monitor and the quantities of light of RBG of the monitor is prepared. Such TRCs can be obtained by observing the XYZ3-stimulus values of more than ten tones (e.g., 16 tones) sampled at regular intervals from the full range of tones (e.g., 256 tones) for each of the primary colors of red (R), green (G) and blue (B) of the RGB data (or RGBW data) and applying them to the g equation out of equations (1) shown below by non-linear regression (a TRC is obtained by linear interpolation or a conversion table if the number of samples is large).

$$r = \frac{X_r}{X_{r,max}} = \left\{ K_{r,gain}\left(\frac{dr}{2^N - 1}\right) + K_{r,offset} \right\}^{\gamma_r} \quad (1)$$

$$g = \frac{Y_g}{Y_{g,max}} = \left\{ K_{g,gain}\left(\frac{dg}{2^N - 1}\right) + K_{g,offset} \right\}^{\gamma_g}$$

$$b = \frac{Z_b}{Z_{b,max}} = \left\{ K_{b,gain}\left(\frac{db}{2^N - 1}\right) + K_{b,offset} \right\}^{\gamma_b}$$

In the above equations (1), variables dr, dg and db respectively represent the input signal values for red, green and blue and variable N represent the number of bits of each input signal. Coefficient $k_{gain}$ represents the gain of each of the colors (e.g., $k_{r.gain}$ represents the gain of red) and coefficient $k_{offset}$ represent the offset of each of the colors (e.g., $k_{r.offset}$ represents the offset of red). Additionally, variables $X_r$, $Y_g$ and $Z_b$ respectively represent the 3-stimulus values of the three colors and variable $X_{r.max}$, $Y_{g.max}$ and $Z_{b.max}$ respectively represent the 3-stimulus values of the three colors when the input signal values are maximal. Thus, variables r, g and b are obtained by normalizing $X_r$, $Y_g$ and $Z_b$ respectively by the maximum values $X_{r.max}$, $Y_{g.max}$ and $Z_{b.max}$ to take a value between 0 and 1.

FIG. 4 is a flow chart illustrating the operation of preparing a TRC corresponding to an input digital signal for red in Step S1 of FIG. 3. Referring to FIG. 4, in Step S21, $XYZ_r$ values (including maximum value $XYZ_{r.max}$) are observed for the sampled several tones from the input signal corresponding to red. Then, in Step S22, the input signal values dr are normalized by dividing them by $2^N-1$ and, in Step S23, the output brightness values are normalized by dividing $X_r$ values by the maximum value $X_{r.max}$. In Step S24, a process of non-linear interpolation is conducted by means of equations (1). Finally, in Step S25, the values of coefficients $k_{r.offset}$, $k_{r.gain}$ and $\gamma_r$ are determined. Note that operations of preparing TRCs corresponding to input digital signals dg and db for green and blue will be conducted similarly.

FIGS. 5A through 5C are exemplary TRCs for red, green and blue prepared in a manner as described above.

Generally, γ values for a monitor refers to those of γs in equations (1). Note that most of the currently available tools utilizes $k_{gain}$=1.0 and $k_{offset}$=0 in equations (1).

Returning to FIG. 3, in Step S2, a matrix representing the linear relationship between the quantities of light of RGB and the monitor and the CIE/XYZ values are determined. If, for example, the monitor in question is of the self-emission type and the law of addition approximately holds true for the quantities of light (r, g, b) when mixing colors, then the CIE/XYZ3-stimulus values ($X_{CRT}$, $Y_{CRT}$, $Z_{CRT}$) can be obtained from the quantities of light of RGB corrected in Step S1 (normalized values) and a 3×m matrix as described below. For the purpose of simplification, a matrix of 3×3 which is of the most simple form, is shown below.

$$\begin{bmatrix} X_{CRT} \\ Y_{CRT} \\ Z_{CRT} \end{bmatrix} = \begin{bmatrix} X_{r,max} & X_{g,max} & X_{b,max} \\ Y_{r,max} & Y_{g,max} & Y_{b,max} \\ Z_{r,max} & Z_{g,max} & Z_{b,max} \end{bmatrix} \begin{bmatrix} r \\ g \\ b \end{bmatrix} \quad (2)$$

Such a matrix can be obtained by observing the XYZ3-stimulus values of each of the three primary colors for the highest brightness.

Note that, in most of the known tools of the type under consideration, the TRCs and the matrix are determined on an assumption that the monitor is not affected by ambient light and used in the dark and the monitor profile is obtained and the TRCs are corrected on the basis of them.

Thus, as shown in FIG. 6, when ambient light is present, the values (CIE/XYZ values) obtained from the image on the monitor will be those of the colors of the self-emission type monitor ($X_{CRT}$, $Y_{CRT}$, $Z_{CRT}$) plus those of the colors of ambient light reflected by the surface of the tube of the monitor ($R_{bk} \times (X_{Amb}, Y_{Amb}, Z_{Amb})$) because ambient light is reflected by the surface of the tube of the monitor so that consequently they may be different from those observed when the profile was prepared (in the dark). Thus, there is a problem accompanying such known tools that the colors of the images on the monitor cannot be accurately corrected when ambient light exists.

Additionally, as seen from FIG. 7A, the TRC brightness will increase (shift from curve a to curve b) when ambient light is present. In FIG. 7A, the horizontal axis represents the value of the normalized input digital signal (or the value of the input digital signal divided by the value of the maximum input digital signal of the monitor) and the vertical axis represent the output brightness of the monitor.

FIG. 7B is a graph obtained by normalizing the vertical axis of FIG. 7A by the value of the maximum brightness. As seen from FIG. 7B, the monitor shows a narrower dynamic range (D2<D1) when ambient light is present (and its performance reflects curve b' with a dynamic range of D2) than when ambient light is not found (and its performance reflects curve a' with a dynamic range of D1).

Thus, the dynamic range is narrowed when ambient light exists so that consequently the image on the monitor lacks sharp contrast to the viewer because of the partly lost dynamic range.

Now, the monitor is provided with a function that allows the user to arbitrarily regulate the contrast, the brightness and the reference white (neutral) point of the monitor. If the function is used to change the contrast, the brightness and the reference white point, the TRC characteristics measured when the profile is prepared (the relationship between the values of the input digital signals and the quantities of light of RGB output to the monitor) will also have to be changed. If such is the case, the characteristics of the monitor will have to be measured once again to update the TRCs in order to accurately correct the colors. However, it is practically impossible to measure the characteristics of the monitor each time the above function is used and hence there exits a problem of a difficulty with which the colors are accurately corrected on the monitor.

Thus, it is necessary to maintain the conditions under which the profile is prepared (that the monitor is used in the dark and the contrast, the brightness and the reference white point at the time of shipment are kept unchanged) in order to accurately correct the colors on the monitor. If this requirement is not met and the conditions have been altered, the characteristics of the monitor have to be measured once again under the current conditions.

DISCLOSURE OF THE INVENTION

It is a first object of the present invention to provide an apparatus and a method for processing images as well as a providing medium that are adapted to properly correct the colors of images.

According to a first aspect of the invention, the chromatic profile of a monitor to be used for outputting an image is adapted to update the profile depending on the information obtained on the viewing environment. Thus, if ambient light changes, the monitor profile will be automatically updated to realize color matching without measuring the operating characteristics of the monitor once again.

It is a second object of the present invention to provide an apparatus and a method for processing images as well as a providing medium that are adapted to automatically update the chromatic profile of a monitor for color matching.

According to a second aspect of the invention, information on the setting of a monitor to be used for outputting an image is obtained and input and the chromatic profile of the monitor is updated according to the obtained input information so that the updated profile is stored in the monitor. Thus, if the user arbitrarily change the setting of the monitor, the operating characteristics of the monitor do not have to be measured after the change because the monitor profile is automatically updated for color matching.

It is a third object of the invention to provide a system and a method for transmitting/receiving images as well as a providing medium that are adapted to make the appearance of the image at the transmitter agree with that of the image at the receiver in terms of colors.

According to a third aspect of the invention, the chromatic profile of the input device, information on the initial operating conditions of the input device when the profile is prepared and information on the current operating conditions of the input device are added in the transmitter to the image data to be transmitted and sent to the receiver which, upon receiving the transmitted image data, extracts the profile, the information on the initial operating conditions and the information on the current operating conditions from the received image data and performs a processing operation of correcting the colors for the image data. Thus, when an image input through the input device of the transmitter is output to the output device of the receiver by way of the internet, for example, and the transmitted cannot update the profile in response to ambient light and the information on the setting of the input device, the output device of the receiver can perform the updating operation for the transmitter in order to make the appearance of the image at the transmitter agree with that of the image at the receiver in terms of colors.

It is a fourth object of the invention to provide an apparatus and a method for processing images as well as a providing medium that are adapted to accurately calibrate the chromatic profile of a monitor with a minimal amount of data obtained by measurement if the black level is isolated.

According to a fourth aspect of the invention, a 3×4 matrix containing elements for offsetting the light emitting components of the display section in a state where the image data is equal to 0 will be generated to obtain color signals that are not dependent on the device in response to the outcome of detecting the emission of light of the display section in a state where the image data is equal to 0 and that of detecting if the law of addition holds true for mixed colors. Thus, the chromatic profile of the monitor can be accurately calibrated with a minimal amount of data obtained by measurement if the black level is isolated.

It is a fifth object of the invention to provide an apparatus and a method for processing images as well as a providing medium that are adapted to accurately carry out an operation of chromatic calibration with a minimal amount of data obtained by measurement.

According to a fifth aspect of the invention, a total of nine tone reproduction curves will be generated in response to the outcome of detecting if the law of proportion holds true or not and then formulas will be generated to obtain color signals that are not device-dependent from the nine tone reproduction curves and the 3-stimulus values for the black level. Thus, the chromatic profile of the monitor can be accurately with a minimal amount of data obtained by measurement.

BEST MODES FOR CARRYING OUT THE INVENTION

Now, the present invention will be described in greater detail by referring to the accompanying drawings that illustrate preferred embodiments of the invention.

Figure 8:
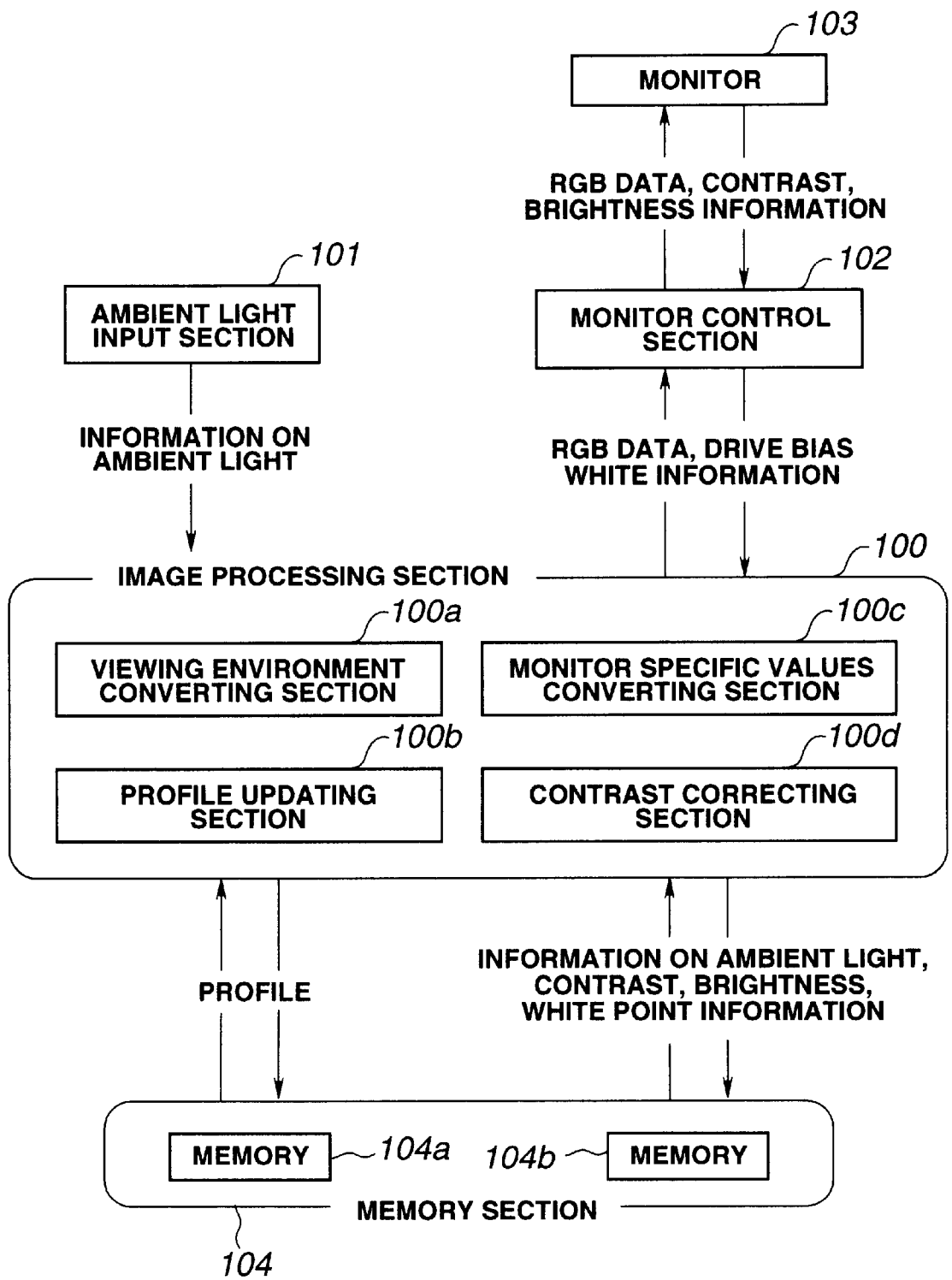
FIG. 8 is a schematic block diagram of an embodiment of the invention, showing the configuration thereof.

FIG. 8 is a schematic block diagram of an embodiment of the invention, showing the configuration thereof.

Referring to FIG. 8, the image processing section 100 of the embodiment comprises a viewing environment converting section 100a, a profile updating section 100b, a monitor specific values converting section 100c and a contrast correcting section 100d and is adapted to update the profile according to the information it acquires with regard to ambient light and the information specific to the monitor 103.

The viewing environment converting section 100a calculate the $XYZ_{Amb}$ values of ambient light and determines by computation the $XYZ_{CRT}$ values and the TRC of the monitor taking the influence of ambient light into consideration. The profile updating section 100b generates a monitor profile that reflects ambient light and the information set and displayed on the display section of the embodiment and stores it in memory section 104.

The monitor specific values converting section 100c prepares TRCs on the basis of the contrast and the brightness selected for the monitor 103 and generates a matrix from the reference white point also selected for the monitor 103. The contrast correcting section 100d corrects the contrast for the TRC1 stored in the memory 104a of the memory section 104 and supplies the obtained TRC2 to the profile updating section 100b. It also generates drive values and bias values for the monitor 103.

Note that the drive values and the bias values respectively represent the gains and the biases of the three colors of red (R), green (G) and blue (B) of the RGB data input to the monitor 103.

The ambient light input section 101 in FIG. 8 typically comprises one or more than one photosensor and is adapted to detect information on the chromaticity and the brightness of ambient light and supplies the obtained information to the image processing section 100 as information on the viewing environment. Note that the ambient light input section 101 may be so arranged that the user may manually input necessary information by way of a GUI (graphical user interface) which will be described hereinafter.

The monitor control section 102 in FIG. 8 automatically alters the TRC characteristics of the monitor 103 according to ambient light and the information selected for it. It also supply the information on the monitor 103 including the values selected for the reference white point, the contrast and the brightness to the image processing section 100.

The monitor 103 is fed with image data (RGB data) that have been processed by the profile stored in the memory section 104 and then outputs and displays the supplied image data.

The memory section 104 comprises memory 104a and memory 104b. The memory 104a stores the monitor profile whereas the memory 104b stores information on the reference white point, the contrast and the brightness of the monitor 103.

The embodiment having the above described configuration operates in a manner as described below.

The embodiment of FIG. 8 is configured as to (1) generate an optimal monitor profile in response to the viewing environment and also (2) generate an optimal monitor profile in response to alteration(s) made on the selected values (on the contrast, the brightness and the reference white point) for the monitor 103. These operations will be discussed sequentially hereinafter.

Figure 9:
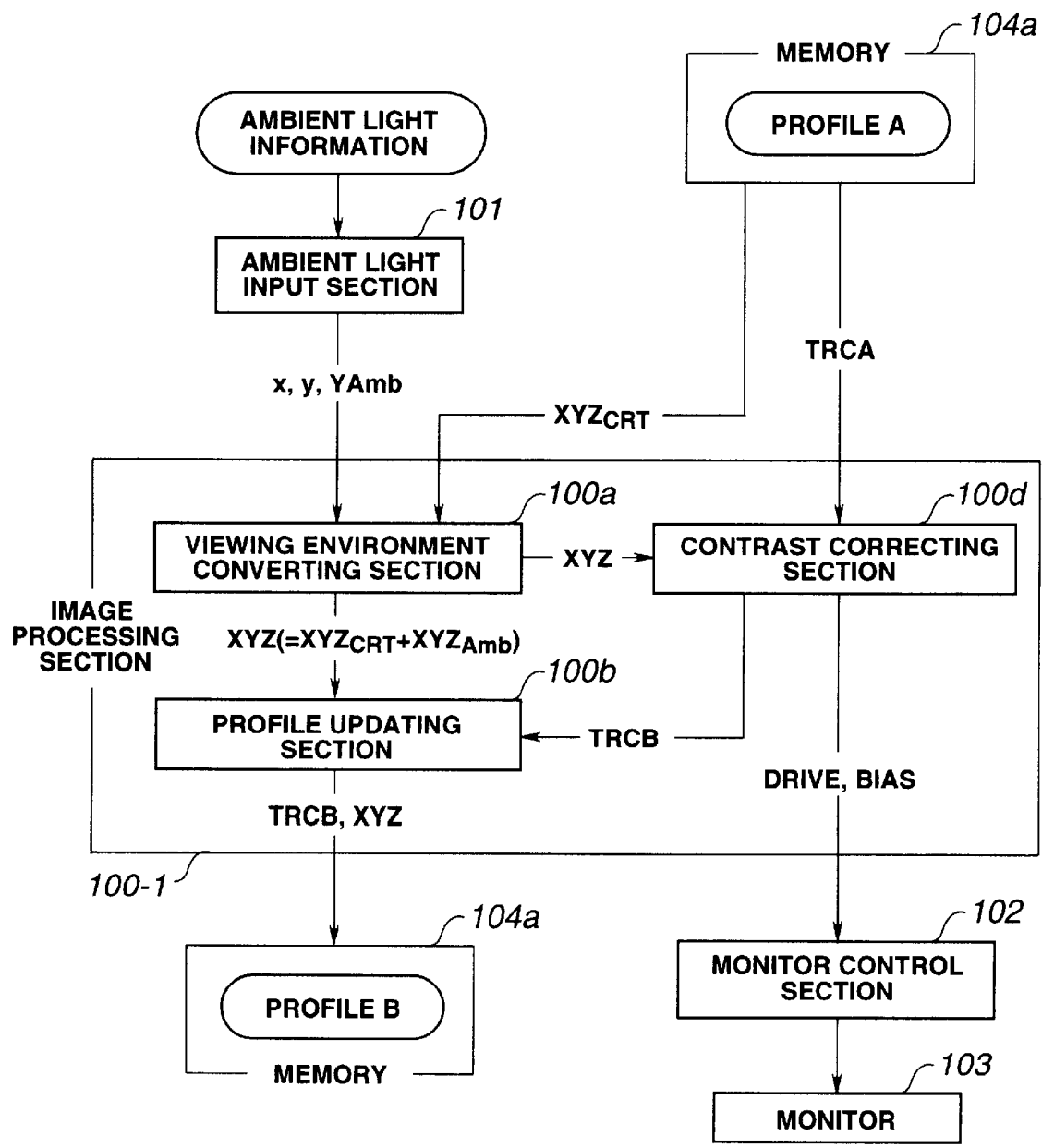
FIG. 9 is a schematic block diagram of the embodiment of FIG. 8, showing the configuration in greater detail.

FIG. 9 is a schematic block diagram of the embodiment of FIG. 8, showing the configuration adapted to generate an optimal monitor profile in response to the viewing environment. In this configuration, the monitor specific values converting section 100c is not taken into consideration. Otherwise, the configuration is identical with that of FIG. 8.

The ambient light input section 101 detects information on ambient light (in terms of the CIE/xy chromaticity and illuminance of ambient light) of the monitor 103 by means of one or more than one photosensors mounted typically on the top of the monitor 103 and supplies it to the image processing section 100-1 as viewing environment information.

Figure 10:
FIG. 10 is a schematic block diagram of a displayed GUI that can be used for the ambient light input section 101 of the embodiment of FIG. 8.

Note that a GUI as shown in FIG. 10 may be displayed on the monitor 103 to input the viewing environment information in place of inputting the information on ambient light (viewing environment) obtained by the photosensors. In the example of FIG. 10, three different light sources of incandescent light, fluorescent light and natural light are available and an appropriate light source can be selected by checking the inside of a check box arranged for them. Additionally, it is so arranged that a predetermined value may be directly input by the user by way of a keyboard (not shown) for the illuminance of the light source. The data input by the user are then converted into the CIE/xy chromaticity and illuminance of ambient light typically by means of a data table.

The viewing environment converting section 100a of the image processing section 100-1 determines by computation the XYZ values of ambient light by substituting the viewing environment information M and the reflectivity $R_{bk}$ of the surface of the tube of the monitor 103 in equation (3) below by the respective values input through the ambient light input section 101:

$$\begin{bmatrix} X_{Amb} \\ Y_{Amb} \\ Z_{Amb} \end{bmatrix} = R_{bk} \cdot \frac{M}{\pi} \cdot \frac{1}{y_{Amb}} \begin{bmatrix} x_{Amb} \\ y_{Amb} \\ 1 - x_{Amb} - y_{Amb} \end{bmatrix} \quad (3)$$

where $X_{Amb}$ and $Y_{Amb}$ respectively represent the x, y chromaticity points of ambient light and M represents the illuminance of ambient light.

Subsequently, the viewing environment converting section 100a reads out the XYZ values ($XYZ_{CRT}$ values) of the monitor 103 corresponding to the input signals values dr, dg and db from the memory 104a (and hence the values obtained by using equations (1) and (2) above) and adds the XYZ values ($XYZ_{Amb}$ values) of light reflected by the surface of the tube as determined by equation (3) above to the above values according to equation (4) below to determine the XYZ values when ambient light exists:

$$\begin{bmatrix} X \\ Y \\ Z \end{bmatrix}_{measured} = \begin{bmatrix} X_{CRT} \\ Y_{CRT} \\ Z_{CRT} \end{bmatrix} + \begin{bmatrix} X_{Amb} \\ Y_{Amb} \\ Z_{Amb} \end{bmatrix} = \begin{bmatrix} X_{CRT} \\ Y_{CRT} \\ Z_{CRT} \end{bmatrix} + \quad (4)$$

$$R_{bk} \cdot \frac{M}{\pi} \cdot \frac{1}{y_{Amb}} \begin{bmatrix} x_{Amb} \\ y_{Amb} \\ 1 - x_{Amb} - y_{Amb} \end{bmatrix}$$

Note that equation (4) above is based on the assumption that the measured values of the colors of the monitor can be expressed as the quantity of light emitted by the monitor itself and the quantity of ambient light reflected by the surface of the tube of the monitor.

The XYZ values obtained for a situation where ambient light exists are then fed to the profile updating section 100b.

Figure 1:
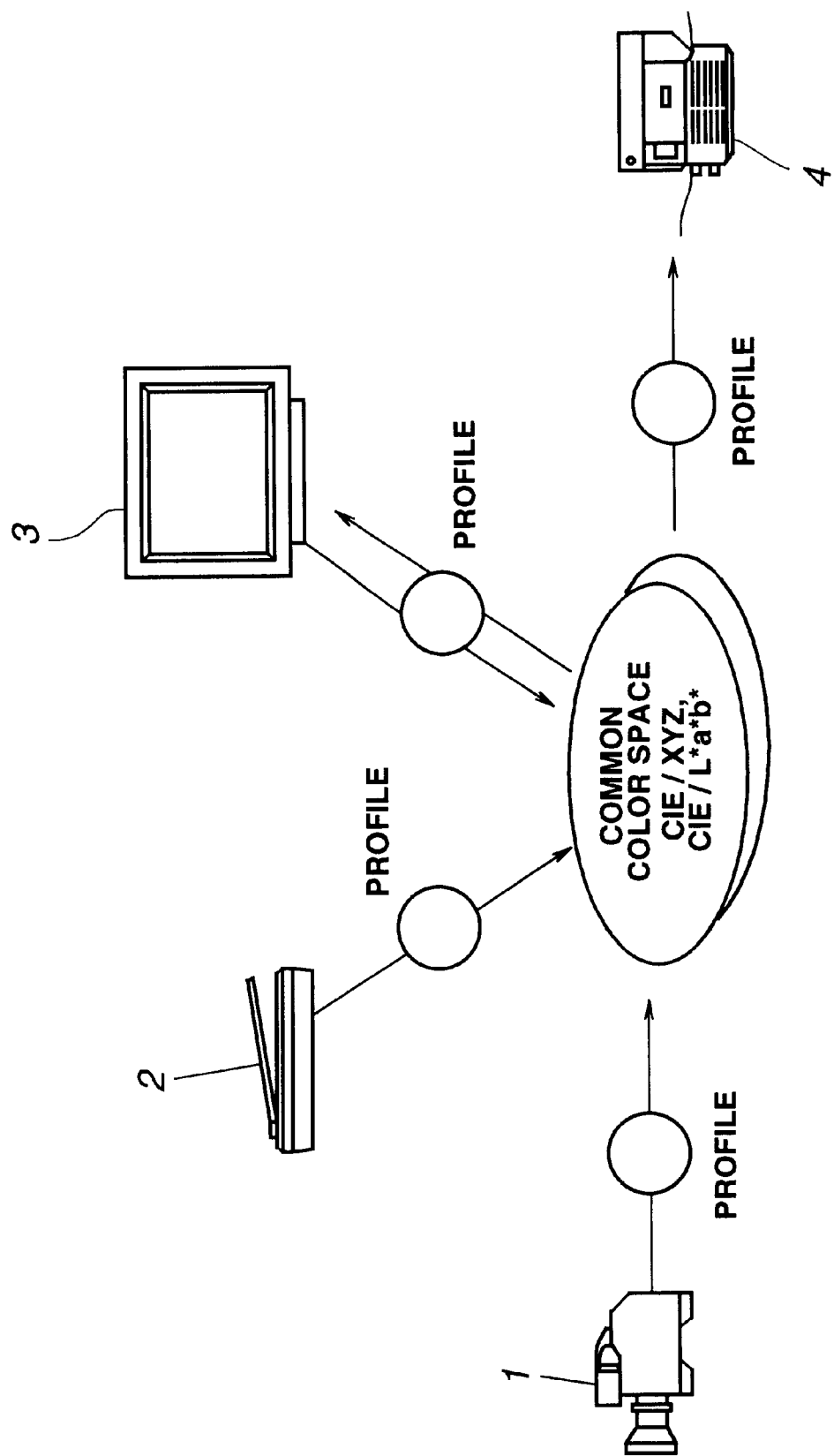
FIG. 1 is a schematic illustration of a CMS.
Figure 2:
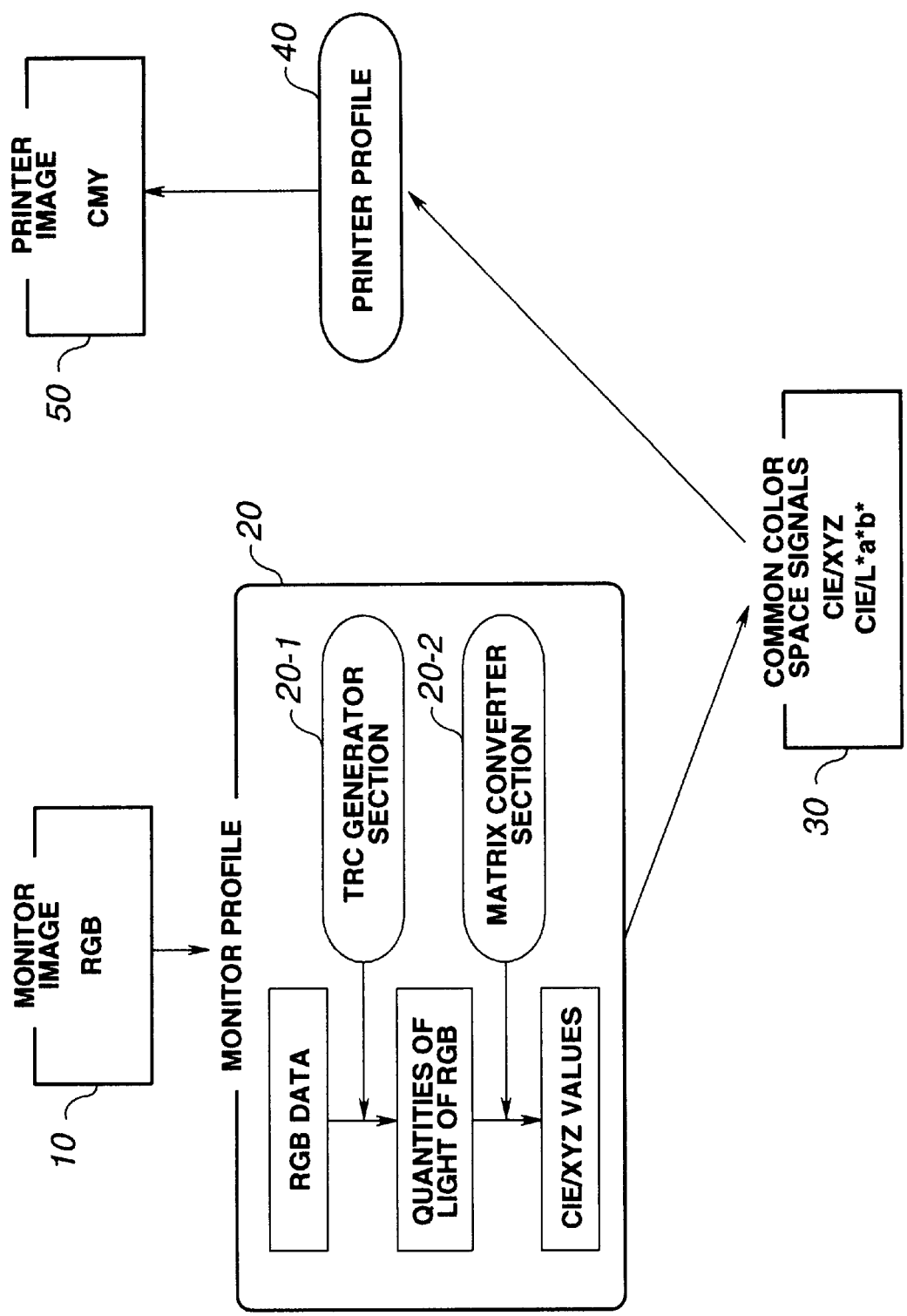
FIG. 2 is a flow chart showing the flow of data when the image on the monitor 3 of FIG. 1 is output to the printer 4.
Figure 3:
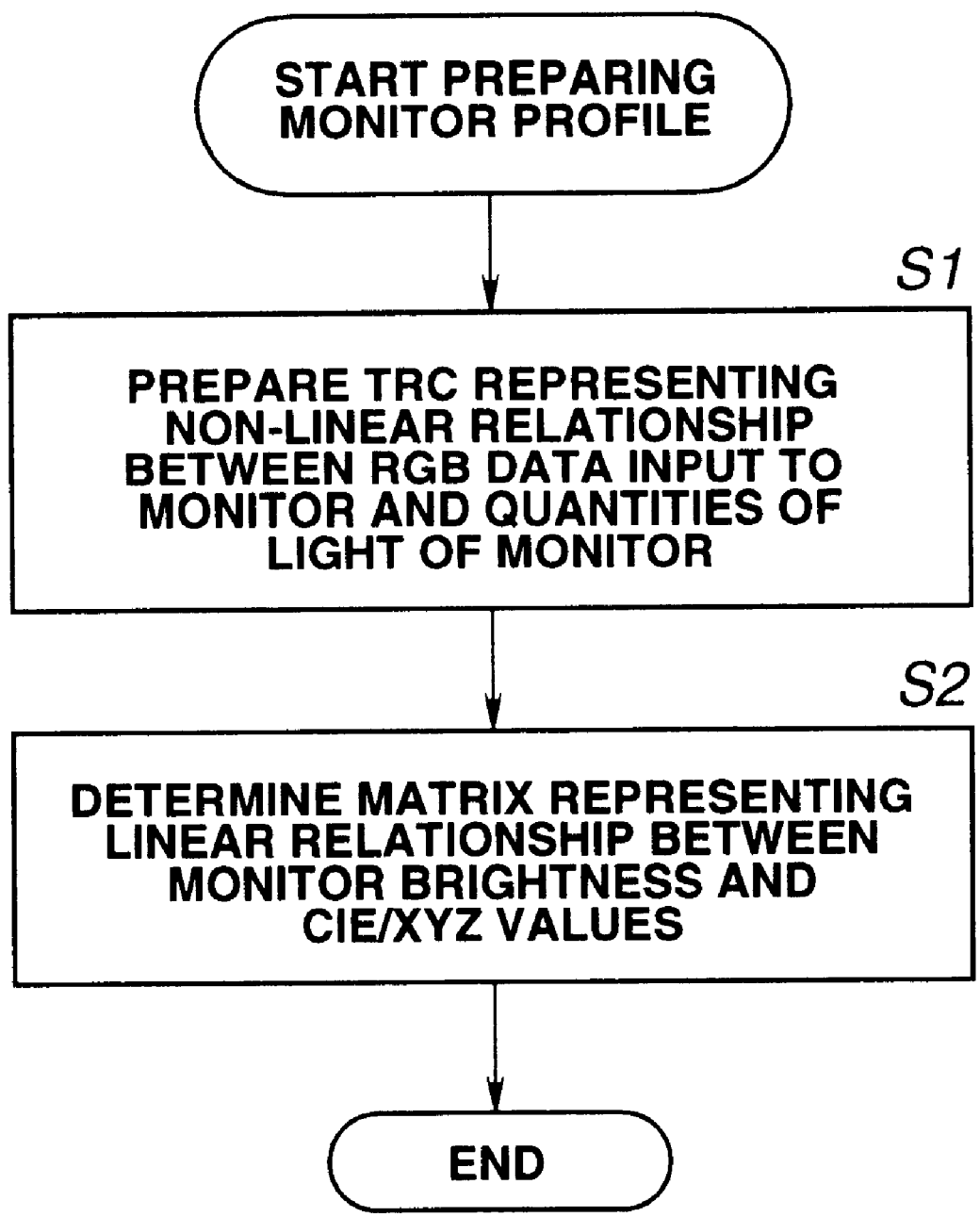
FIG. 3 is a flow chart of the operation of preparing a monitor profile.
Figure 4:
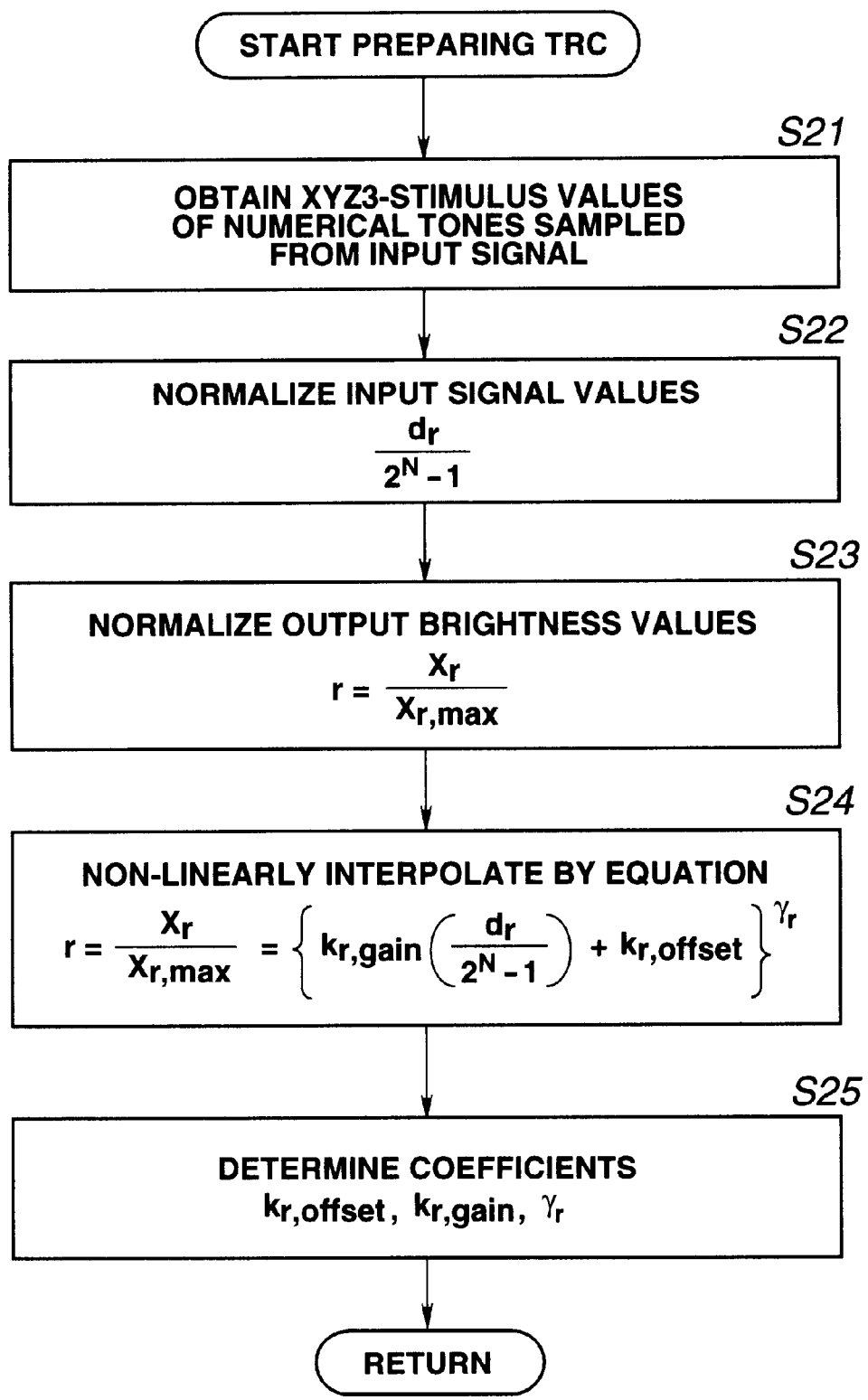
FIG. 4 is a flow chart illustrating a conventional operation of preparing a TRC corresponding to an input digital signal.
Figure 5A:
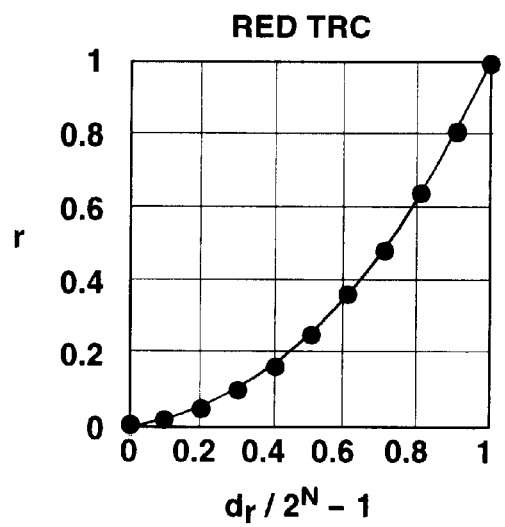
FIGS. 5A through 5C are exemplary graphs of TRCs for the three primary colors of RGB.
Figure 5B:
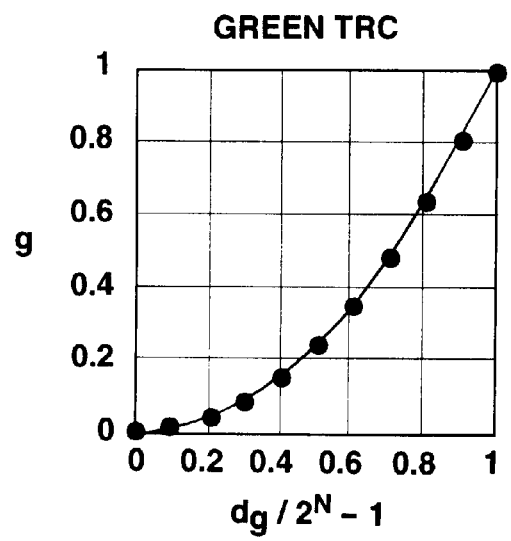
Figure 5C:
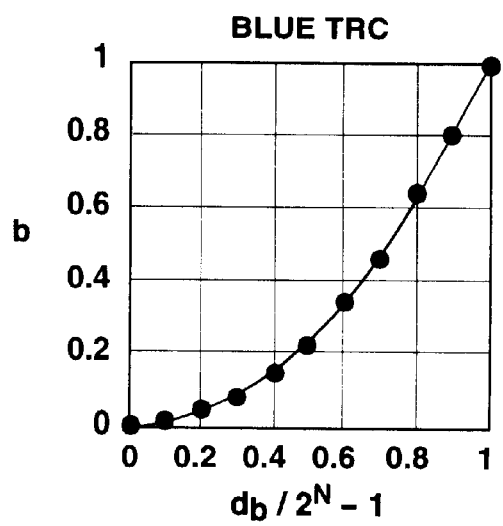
Figure 6:
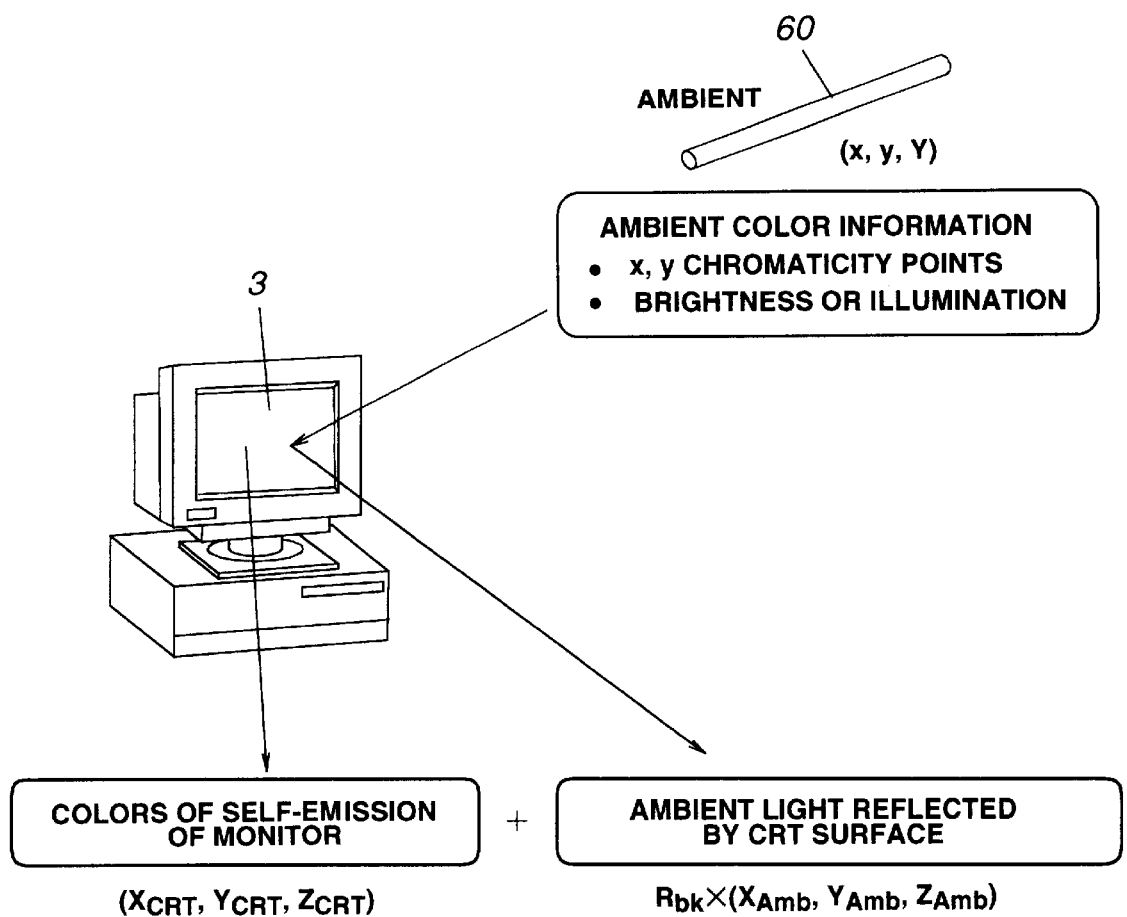
FIG. 6 is a schematic illustration showing how the measured color values change when ambient light exists.
Figure 7A:
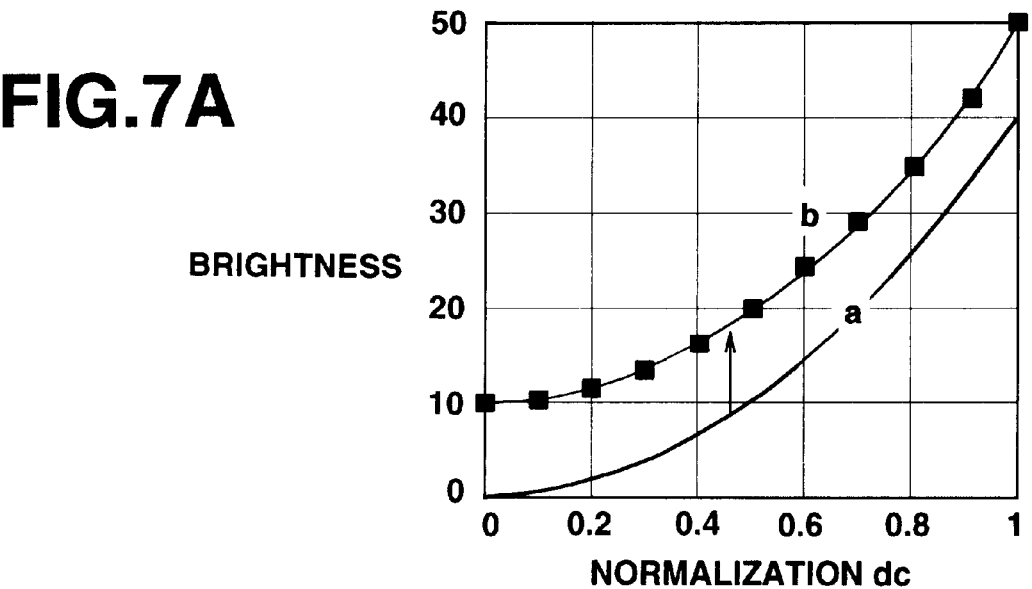
FIGS. 7A and 7B are graphs illustrating how the dynamic range is modified when ambient light exists.
Figure 7B:
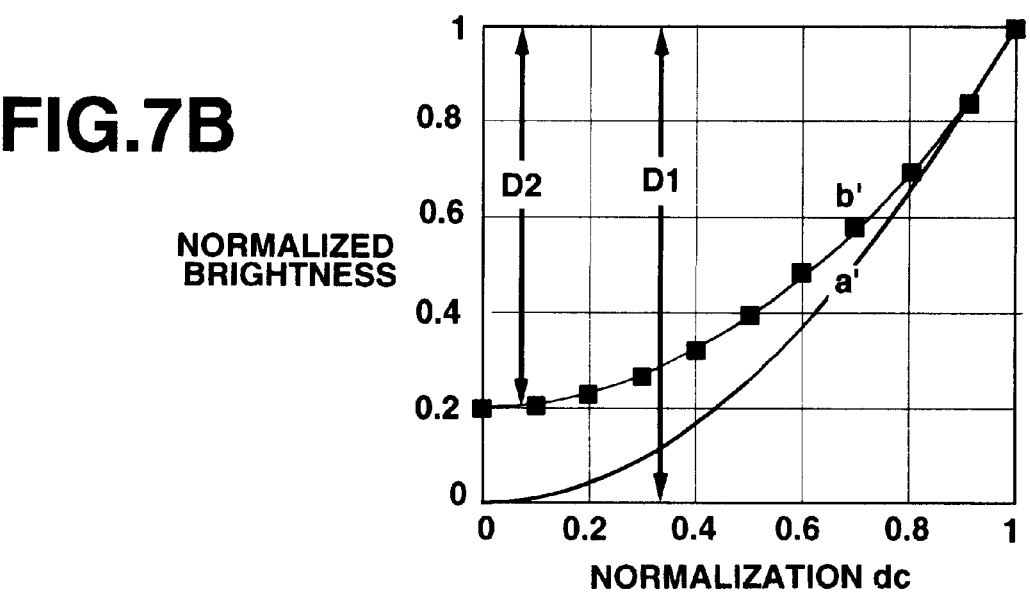

With the above processing operation, it is now possible to generate XYZ values for a situation where ambient light exists. However, as described above by referring to FIGS. 6 and 7, as the illuminance of ambient light rises, the apparent dynamic range of the image on the monitor screen is narrowed to lose its sharp contrast. The contrast correcting section 100d compensates the loss of contrast due to the raised illuminance of ambient light by means of a processing operation as described below.

This processing operation for correction is carried out by modifying the coefficient $k_{offset}$ for the offset of any of the TRCs of the monitor profile generated from the XYZ3-stimulus values of the monitor 103 that is obtained in the dark in the negative direction (and the coefficient $k_{gain}$ for the gain in the direction of making it greater than 1).

Figure 11A:
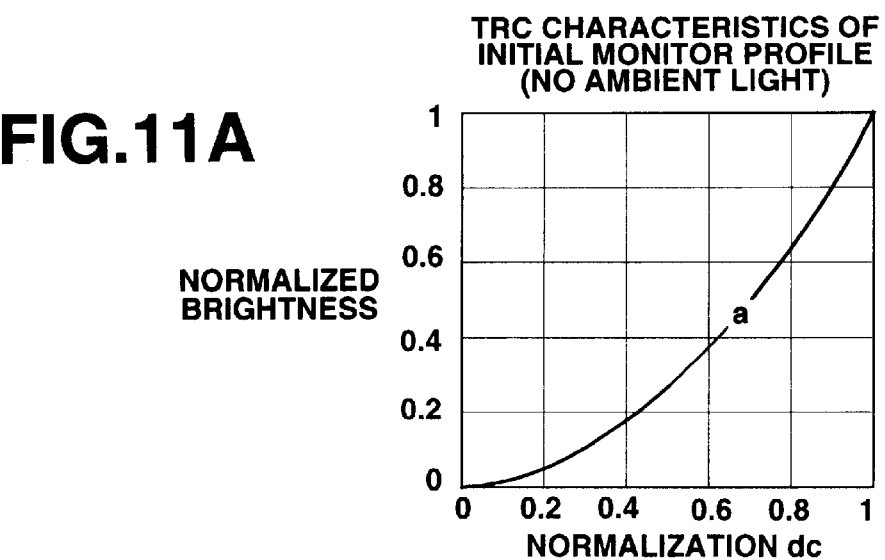
FIGS. 11A through 11C are graphs showing exemplary TRC characteristics that may be obtained when ambient light exists.
Figure 11B:
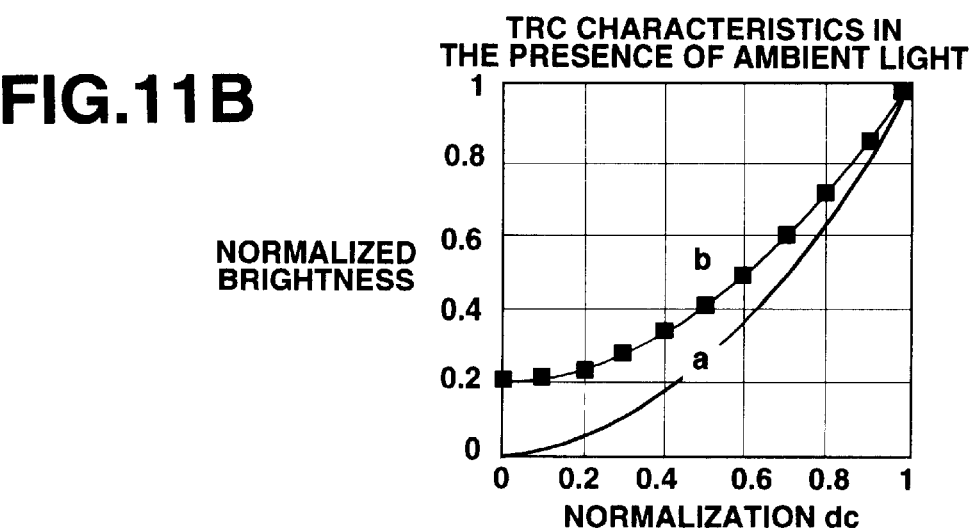
Figure 11C:
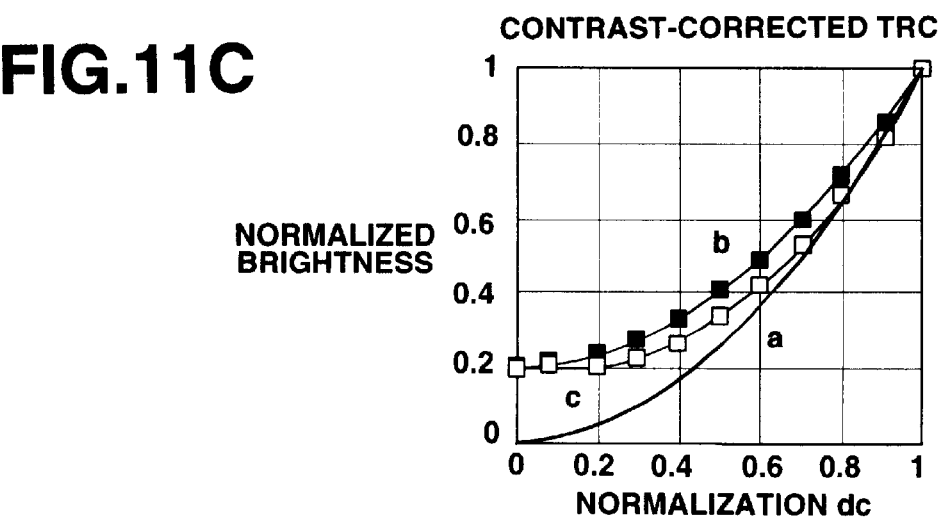

For example, if the curve a of FIG. 11A is one of the TRCs for the monitor 103 obtained when no ambient light exists (in the dark), the TRC is shifted to curve b in FIG. 11B when the monitor 103 is placed in an environment where ambient light exists. Thus, in this embodiment, a processing operation will be performed so as to make the TRC (curve c)

obtained after the correction to be found closer to the TRC (curve a) obtained in the dark as shown in FIG. 11C.

While the above processing operation for correction is performed independently for each color, or for each of the signals of RGB data, all the operations are identical. Therefore, only the operation for G (green) will be described hereinafter.

Firstly, the TRC obtained for G in the dark (representing the relationship between the quantity of green light g and the input digital signal dg for green) is expressed by equation (5) below:

$$g = \frac{Y_g}{Y_{gmax}} = \left\{ k_{g.gain} \left( \frac{dg}{2^N - 1} \right) + k_{g.offset} \right\}^{\gamma_g} \quad (5)$$

where $Y_g$, $Y_{gmax}$ represent respectively the brightness and the maximum brightness of G observed in the dark.

Now, assume that ambient light is reflected by the surface of the tube of the monitor 103. Then, the brightness $Y_{gAmb}$ in the presence of ambient light is expressed by equation (6) below:

$$Y_{gAmb} = Y_g + R_{bk} \cdot Y_{Amb} \quad (6)$$

$$= Y_{gmax} \left\{ k_{g.gain} \left( \frac{dg}{2^N - 1} \right) + k_{g.offset} \right\}^{\gamma_g} + R_{bk} \cdot Y_{Amb}$$

where $R_{bk}$ represents the reflectivity of the surface of the tube of the monitor 103 and $Y_{Amb}$ represents the brightness of ambient light.

A TRC as shown below (TRC in the presence of ambient light) is obtained by normalizing equation (6).

$$g_{Amb} = \frac{Y_{gAmb}}{Y_{gAmbmax}} = \frac{(Y_g + R_{bk} \cdot Y_{Amb})}{(Y_{gmax} + R_{bk} \cdot Y_{Amb})} \quad (7)$$

$$= \frac{1}{(Y_{gmax} + R_{bk} \cdot Y_{Amb})} \left[ Y_{gmax} \cdot \left\{ k_{g.gain} \left( \frac{dg}{2^N - 1} \right) + k_{g.offset} \right\}^{\gamma_g} + R_{bk} \cdot Y_{Amb} \right]$$

The curve to be corrected for contrast is the TRC obtained in the dark has to meet the requirement expressed by formula below.

$$g_{Amb} \approx g \quad (8)$$

$\gamma_g$ in equation (7) represents a (constant) value specific to the monitor 103 so that the values of $k_{g.gain}$ and $k_{g.offset}$ have to be determined to meet the requirement of (8). If the values of $k_{g.gain}$ and $k_{g.offset}$ satisfying the requirement of (8) are $k_{g.Amb.gain}$ and $k_{g.Amb.offset}$, equation (9) below can be drawn.

$$\frac{1}{(Y_{gmax} + R_{bk} \cdot Y_{Amb})} \left[ Y_{gmax} \cdot \left\{ k_{g.Amb.gain} \left( \frac{dg}{2^N - 1} \right) + k_{g.Amp.offset} \right\}^{\gamma_g} + R_{bk} \cdot Y_{Amb} \right] \approx g \quad (9)$$

Formula (9) can be modified to become formula (10) below.

$$\left\{ k_{g.Amb.gain} \left( \frac{dg}{2^N - 1} \right) + k_{g.Amp.offset} \right\}^{\gamma_g} \approx \quad (10)$$

$$\frac{1}{Y_{gmax}} \{ g(Y_{gmax} + R_{bk} \cdot Y_{Amb}) - R_{bk} \cdot Y_{Amb} \}$$

Thus, $k_{g.Amb.gain}$ and $k_{g.Amb.offset}$ satisfying the requirement of formula (10) above are then supplied to the contrast correcting section 100d and the monitor control section 102 as drive signal and bias signal so that the contrast and the brightness of the monitor 103 are regulated according to these values. Meanwhile, the new TRC determined by equation (7) is supplied from the contrast correcting section 100d to the profile updating section 100b as TRCB.

Thus, the contrast correcting section 100d reads out the TRCA from the profile A (a profile prepared without taking ambient light into consideration) stored in the memory 104a and inputs the XYZ values output from the viewing environment converting section 100a to determine $k_{g.Amb.gain}$ and $k_{g.Amb.offset}$ that satisfy the requirement of formula (10) by means of non-linear recurrence. It then outputs these values to the monitor control section 102 respectively as a drive signal and a bias signal.

Additionally, the contrast correcting section 100d outputs the new TRC obtained by substituting $k_{g.gain}$ and $k_{g.offset}$ of equation (7) with $k_{g.Amb.gain}$ and $k_{g.Amb.offset}$ respectively (or TRC prepared by taking ambient light into consideration) as TRCB to the profile updating section 100b. As a result, the profile updating section 100b stores both the XYZ values fed from the viewing environment converting section 100a and the profile B generated from the TRCB fed from the contrast correcting section 100d (or profile prepared by taking ambient light into consideration) into the memory 104a.

Thus, it is possible to compensate the loss of contrast by the above processing operation for correcting the contrast.

However, as a result of the above contrast compensating operation, there can be occasions where the image displayed on the monitor 103 can appear dark. If such is the case, it is desirable that the determined values of $k_{g.Amb.gain}$ and $k_{g.Amb.offset}$ are multiplied by an appropriate constant of proportion.

If the monitor 103 is a broadcast monitor, values such as $\gamma = 2.2$, $k_{gain} = 1.0$ and $k_{offset} = 0$ will be used in the dark. If such a monitor is used in an office, the above problem of the displayed image that appears dark can be alleviated by selecting a value between 1.0 and 1.4 for $k_{gain}$ and a value between −0.4 and 0.0 for $k_{offset}$.

As described above, the operation of correcting the measured color values of the viewing environment converting section 100a is an operation of updating the relationship between the CIE/XYZ values that are not device-dependent and the RGB data of the monitor 103 and hence in line with the concept of CMS as discussed earlier.

The contrast correcting section 100d corrects the contrast of the image displayed on the monitor in order to reproduce the desired colors in the presence of ambient light.

Thus, with the above processing operation, it is possible to generate an optimal profile B for a viewing environment where ambient light exists from the profile A prepared for a completely dark viewing environment without determining the characteristics of the monitor 103 for another time.

Now, the configuration (2) of the embodiment adapted to generate an optimal profile when the user modifies the setting of the monitor 103 (in terms of contrast, brightness and reference white point) will be described by referring to FIG. 12.

Figure 12:
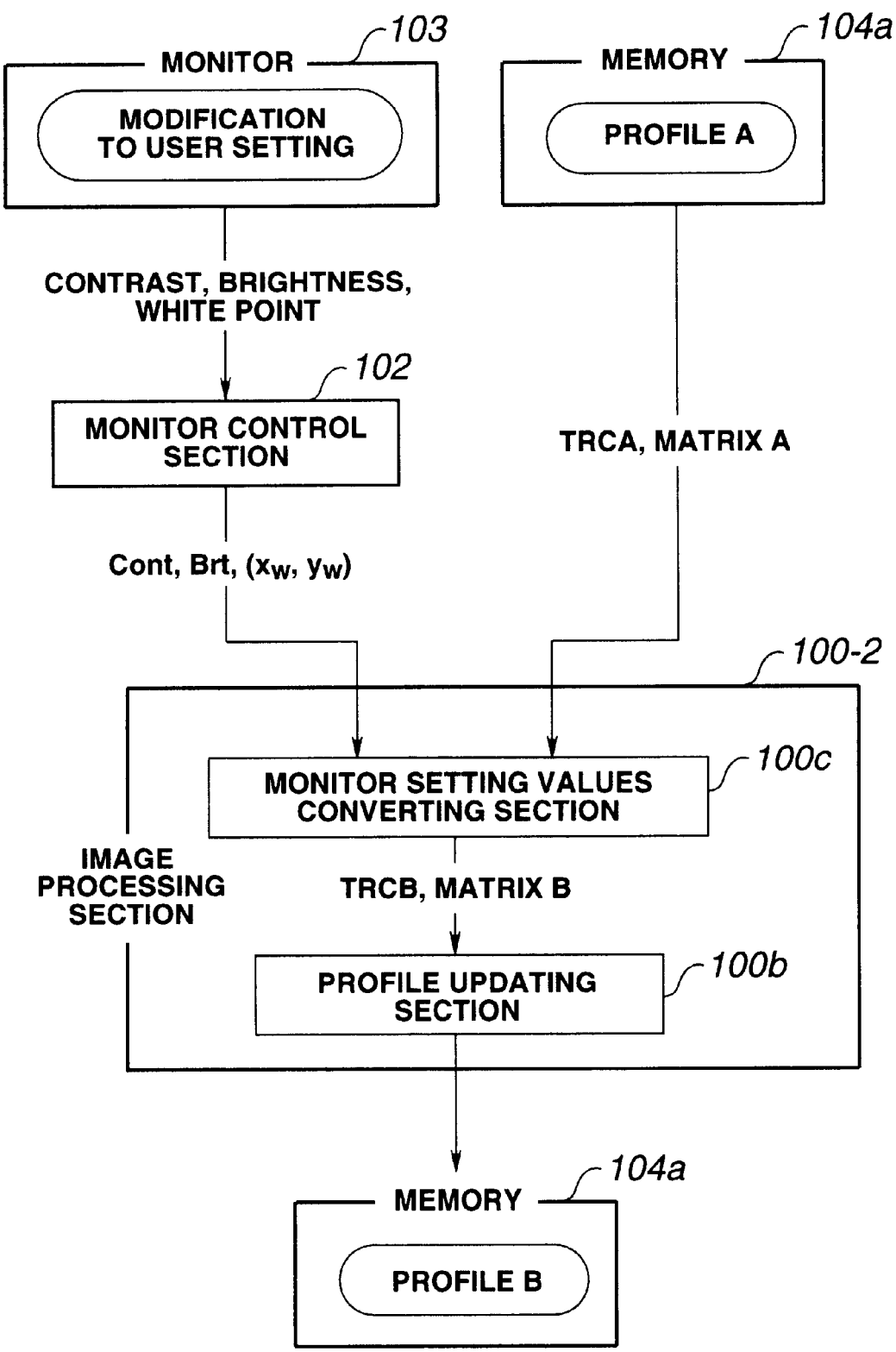
FIG. 12 is a schematic block diagram of the embodiment of FIG. 8, showing the configuration in greater detail.

In FIG. 12, the viewing environment converting section 100a and the contrast correcting section 100d are omitted from the configuration of FIG. 8. Otherwise, the configuration is identical with that of FIG. 8. Before describing the operation of this configuration, a model of operation of monitor 103 will be discussed by referring to FIG. 13.

Figure 13:
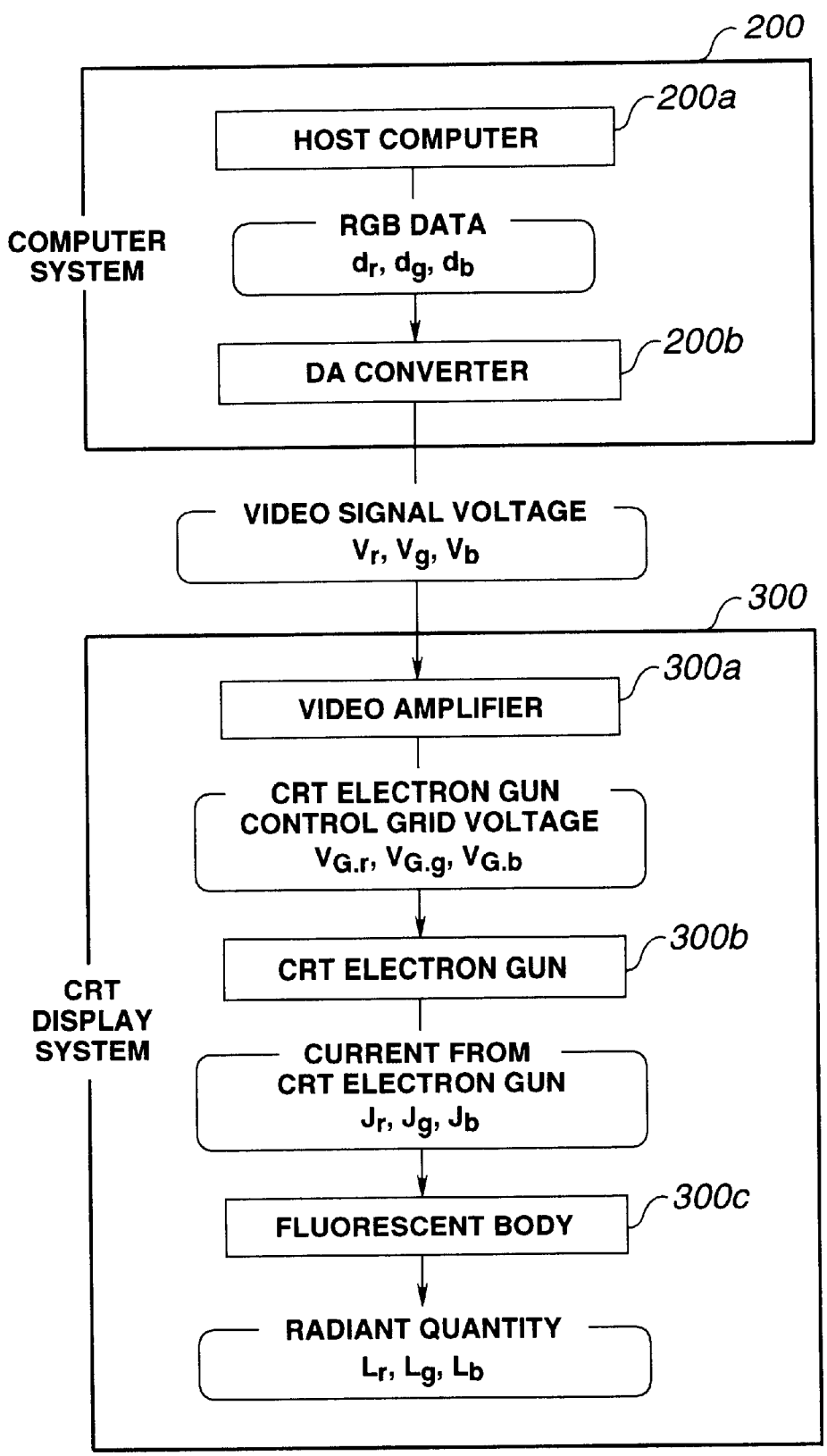
FIG. 13 is a schematic block diagram of a monitor, illustrating an model of operation.

FIG. 13 is a schematic block diagram of a monitor, illustrating an model of operation. Referring to FIG. 13, computer system 200 comprises a host computer 200a and a DA (Digital to Analog) converter 200b and is adapted to output video signals corresponding to a requested image.

On the other hand, CRT display system 300 comprises a video amplifier 300a, a CRT electron gun 300b and a fluorescent body 300c as well as other components.

The model operates in a manner as described below. For the simplicity of explanation, only signals for R (red) will be described.

Of the RGB data output from the host computer 200a, the input digital signal dr for red color is linearly converted into a video signal voltage $V_r$ by the DA converter 200b, using equation (11) below:

$$V_r = Cont \cdot \left(\frac{dr}{2^N - 1}\right) + Brt \tag{11}$$

where Cont and Brt respectively correspond to the information on the contrast and the one on the brightness selected for the monitor 103 and determine the video voltage of the white level and that of the black level of the monitor 103.

The video signal voltage $V_r$ obtained by the DA converter 200b is amplified by the video amplifier 300a of the CRT display system 300, using equation (12) below and then supplied to the electron gun 300b:

$$V_{G,r} = drive_r \cdot V_r + bias_r \tag{12}$$

where driver represents the gain of the video amplifier 300a and $bias_r$ represents the offset of the video amplifier 300a.

The rate at which an electron beam is shot from the CRT electron gun 300b is a function of the voltage different of the control grid voltage ($V_{G,r}$) and the cutoff voltage ($V_{C,r}$) at which an electron beam starts to be emitted from the gun and the electric current ($j_r$) gushes out from the electron gun 300b is expressed by known equation (13) below:

$$j_r = \rho(V_{G,r} - V_{C,r})^{\gamma r} (V_{G,r} - V_{C,r} \geq 0) \tag{13}$$

where ρ represents the coefficient of the current efficiency of the electric current discharged from the electron gun 300b and is referred to as perveance.

The electrons discharged from the electron gun 300b collide with the fluorescent body 300c applied to the inner surface of the CRT panel to make it emit light. The radiant quantity of light $L_r$ from the fluorescent body 300c is expressed by equation (14) below:

$$L_r = k_r \cdot j_r \tag{14}$$

where $k_r$ is a constant indicating the extent of influence on the light emitting efficiency of the fluorescent body and the radiant quantity of the CRT glass panel.

Now, equation (15) can be derived from equations (11) through (14).

$$L_r = k_r \cdot \rho \left\{ drive_r \left[Cont \cdot \left(\frac{dr}{2^N-1}\right) + Brt\right] + bias_r - V_{c,r} \right\}^{\gamma r} \tag{15}$$

If $bias_r - V_{c,r}$ in equation (15) is replaced by $bias_r$, or if $bias_r - V_{c,r} = bias_r$, then equation (16) below is obtained.

$$L_r = k_r \cdot \rho \left\{ drive_r \left[Cont \cdot \left(\frac{dr}{2^N-1}\right) + Brt\right] + bias_r \right\}^{\gamma r} \tag{16}$$

From equation (16), the radiant quantity $L_{r,max}$ when the input digital signal (dr) for red shows the maximum value ($dr = 2^N - 1$) is obtained by equation (17) below.

$$L_{r,max} = k_r \cdot \rho [drive_r(Cont + Brt) + bias_r]^{\gamma r} \tag{17}$$

Then, equation (18) is obtained by normalizing $L_r$ by $L_{r,max}$.

$$\frac{L_r}{L_{r,max}} = \left\{ \frac{drive_r \left[Cont \cdot \left(\frac{dr}{2^N-1}\right) + Brt\right] + bias_r}{drive_r(Cont + Brt) + bias_r} \right\}^{\gamma r} \tag{18}$$

The equation (18) can be modified to produce equation (19) below.

$$\frac{L_r}{L_{r,max}} = \left[\left(\frac{drive_r \cdot Cont}{drive_r(Cont + Brt) + bias_r}\right)\left(\frac{dr}{2^N-1}\right) + \left(\frac{drive_r \cdot Brt + bias_r}{drive_r(Cont + Brt) + bias_r}\right)\right]^{\gamma r} \tag{19}$$

Assume here that gain coefficient $K_{r,gain}$ and offset coefficient $k_{r,offset}$ of the normalization model are expressed by equations (20) below.

$$k_{r,gain} = \frac{drive_r \cdot Cont}{drive_r(Cont + Brt) + bias_r} \tag{20}$$

$$k_{r,offset} = \frac{drive_r \cdot Brt + bias_r}{drive_r(Cont + Brt) + bias_r}$$

Then, equation (21) is obtained by substituting equation (19) by equation (20).

$$\frac{L_r}{L_{r,max}} = \left[k_{r,gain}\left(\frac{dr}{2^N-1}\right) + k_{r,offset}\right]^{\gamma r} \tag{21}$$

The equation (21) represents the relationship between the radiant quantity of the fluorescent body for red and the input digital signal value dr. and is identical with equations (1) above to prove that the above model fits well to the actual monitor 103.

Thus, the TRC showing the relationship between the quantity of light of the monitor and the input digital signal value can also be expressed by equation (21) or (1). Since γ is a (constant) value specific to the monitor in either of these equations, if any of the values for the setting of the monitor 103 is changed, a new TRC can be obtained by modifying only $K_{.gain}$ and $K_{r,offset}$.

Now, from equation (20), it will be appreciated that Cont and Brt contained in the two equations correspond respectively to the contrast and the brightness of the monitor. As a matter of fact, $K_{r,gain}$ and $K_{r,offset}$ change their values as the values of Cont. and Brt change.

Note that Cont and Brt are common to all R, G and B signals and hence the quantity of light corresponding to any of such signals change when these values are modified.

Now, an occasion where the user wants to modify the reference white point of the monitor 103 will be discussed below.

The reference white point of the monitor 103 is determined by the ratio of the quantities of light of RGB. Thus, the reference white point can be modified by modifying the gain ($drive_r$ in the case of red) and the offset ($bias_r$ in the case of red) of the video amplifier for each of the colors as expressed in equation (20) above.

Thus, if the user wants to modify the reference white point of the monitor 103, an optimal TRC can be generated in response to the modification by correcting the value of the gain and that of the offset ($k_{gain}$, $k_{offset}$) for each of the colors of the monitor profile.

Since the chromaticity value of white changes as the reference white point changes, the matrix of equation (2) showing the relationship between the quantities of light and the CIE/XYZ values of the monitor 103 will also change. Then, the modified matrix can be obtained in a manner as described below.

Firstly, r=1, g=0 and b=0 are used in equation (2) showing the relationship between the brightness values (CIE/XYZ values) and the quantities of light (r, g, b) to determine the CIE/XYZ values ($X_{r,max}$, $Y_{r,max}$, $Z_{r,max}$) for the maximal brightness of red.

Subsequently, the CIE/xyz chromaticity values ($x_r$, $y_r$, $z_r$) of red is obtained by means of equations (22) below showing the relationship between CIE/XYZ values and CIE/xyz values.

$$x_r = \frac{X_{r,max}}{X_{r,max} + Y_{r,max} + Z_{r,max}} \quad (22)$$

$$y_r = \frac{Y_{r,max}}{X_{r,max} + Y_{r,max} + Z_{r,max}}$$

$$z_r = 1 - x_r - y_r$$

Then, a similar operation will be conducted for both green and blue to determine the values of ($x_g$, $y_g$, $z_g$) and ($x_b$, $y_b$, $z_b$).

Note that the relationship between the color temperature and the chromaticity point of white of the monitor 103 may be expressed in the form of a data table so that chromaticity point data ($x_w$, $y_w$, $z_w$) corresponding to the modified color temperature may be read out from the table.

Then, the mixing ratio ($h'_r$, $h'_g$, $h'_b$) that provides a reference white point for the maximal quantities of light of R, G and B is determined from the data obtained in a manner as described above. Since the monitor 103 is a self-emission type device and the law of addition substantially holds true for mixed colors, equations (23) below can be drawn.

$$h'_r x_r + h'_g x_g + h'_b x_b = x_w$$
$$h'_r y_r + h'_g y_g + h'_b y_b = y_w$$
$$h'_r z_r + h'_g z_g + h'_b z_b = z_w \quad (23)$$

Since the chromaticity data ($x_w$, $y_w$, $z_w$) are proportional to the stimuli of the colors, equations (24) below can be obtained through normalization by $y_w$, using $h_r = h'_r/y_w$, $h_g = h'_g/y_w$ and $h_b = h'_b/y_w$.

$$\begin{bmatrix} x_r & x_g & x_b \\ y_r & y_g & y_b \\ z_r & z_g & z_b \end{bmatrix} \begin{bmatrix} h_r \\ h_g \\ h_b \end{bmatrix} = \begin{bmatrix} x_w/y_w \\ 1 \\ z_w/y_w \end{bmatrix} \quad (24)$$

Thus, the mixing ratio ($h_r$, $h_g$, $h_b$) of the colors can be obtained by solving the equation (24) above. Then, CIE/XYZ values can be obtained from the values of r, g, b that are obtained through normalization using the maximum brightness values of R, G, B and equation (25) generated by using the mixing ratio.

$$\begin{bmatrix} h_r x_r & h_g x_g & h_b x_b \\ h_r y_r & h_g y_g & h_b y_b \\ h_r z_r & h_g z_g & h_b z_b \end{bmatrix} \begin{bmatrix} r \\ g \\ b \end{bmatrix} = \begin{bmatrix} X_{CRT} \\ Y_{CRT} \\ Z_{CRT} \end{bmatrix} \quad (25)$$

where 0<r, g, b<1 and 0<$Y_{CRT}$<1.

As a result of the above operations, the matrix can be updated whenever the reference white point is modified.

Now, the operation of the embodiment of FIG. 12 will be described on the basis of the above explanation.

If the setting of the monitor 103 (in terms of contrast or brightness) is modified, the monitor control section 102 retrieves the values of Cont and Brt from the monitor 103 and supplies them to the monitor specific values converting section 100*c* of the image processing section 100-2.

Then, the monitor specific values converting section 100*c* generates a new TRCB by correcting the values of the gain and the offset ($k_{gain}$, $k_{offset}$) in equations (1), referring to the values of Cont and Brt fed from the monitor control section 102 and supplies the new TRCB to the profile updating section 100*b*.

If, on the other hand, the reference white point of the monitor 103 is modified, the monitor specific values converting section 100*c* retrieves the data on the chromaticity point corresponding to the modified color temperature from the data table stored in advance.

Then, it generates a new matrix by solving the equation (24) and determining the mixing ratio ($h_r$, $h_g$, $h_b$) and outputs it to the profile updating section 100*b* as matrix B.

The profile updating section 100*b* prepares a new profile, or profile B, on the basis of the TRCB output from the monitor specific values converting section 100*c* and the matrix B and stores it in a predetermined region of the memory 104*a*.

With the above operations, if the data on the setting of the monitor (contrast, brightness, reference white point) are modified by the user, it is now possible to generate a profile corresponding to the new setting of the monitor 103 by updating the (initial) profile prepared in the dark without measuring the values of the characteristics of the monitor 103 once again.

Figure 14:
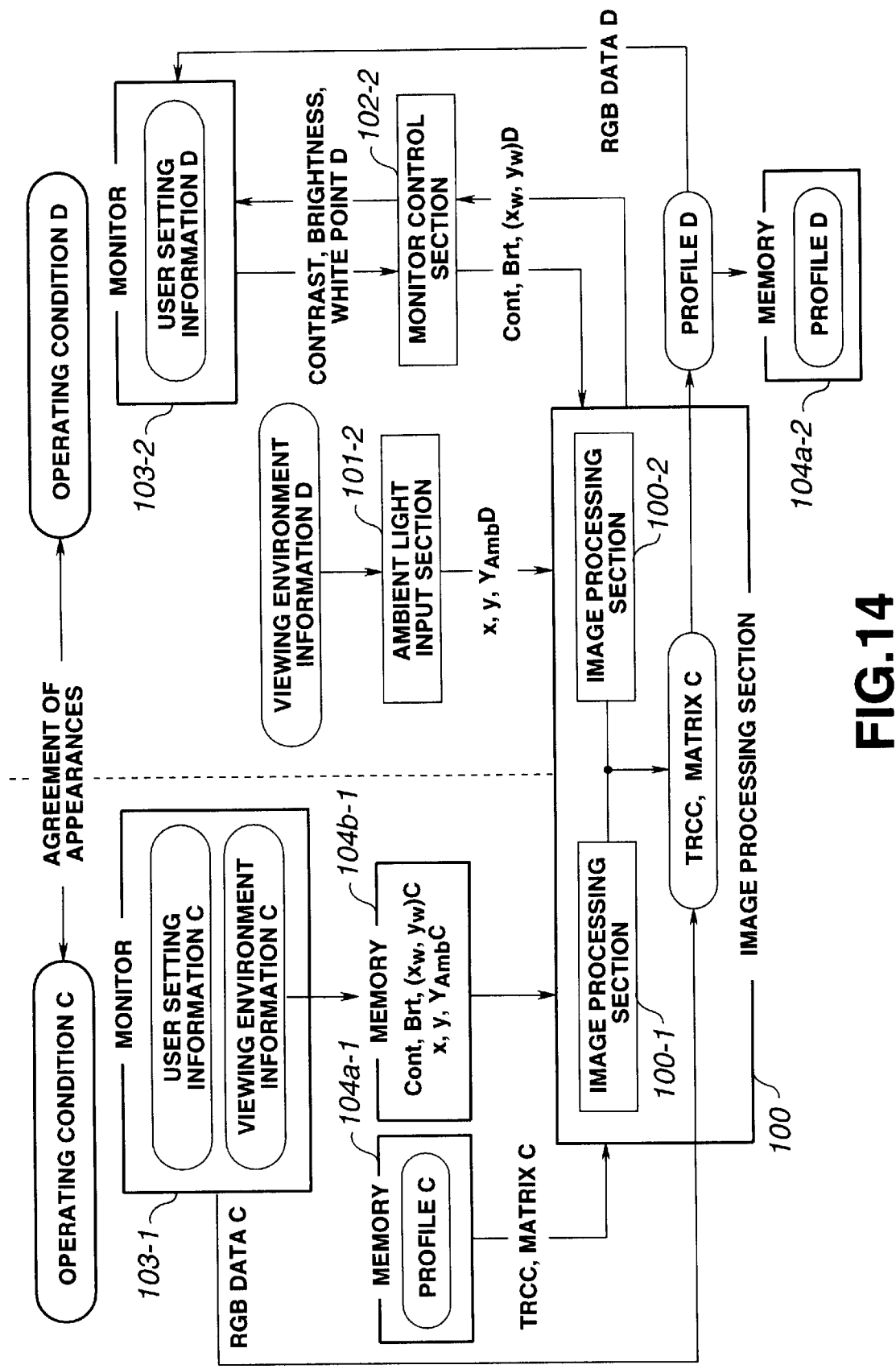
FIG. 14 is a schematic block diagram of another embodiment of the invention, showing the configuration thereof.

FIG. 14 is a schematic block diagram of another embodiment of the invention, showing the configuration thereof. Note that, in FIG. 14, the components same as or similar to those of FIG. 8 are denoted respectively by the same reference symbols and will not be described any further.

This embodiment is so designed that the appearance of colors is held unchanged if the image being displayed by it under a set of predetermined operating conditions, or conditions 1, is moved to a place with a different set of operating conditions, or conditions 2.

In FIG. 14, monitor 103-1 refers to the monitor when it is used in operating conditions C (conditions 1), which are represented by setting information C and ambient light information (viewing environment information) C.

Then, in FIG. 14, monitor 103-2 refers to the monitor when it is used in operating conditions D (conditions 2), which are represented by setting information D and ambient light information (viewing environment information) D. Thus, the monitor 103-*a* and the monitor 103-2 are a same and identical monitor.

The image processing section 100 comprises image processing section 101-1 and image processing section 101-2 respectively shown in FIGS. 9 and 12.

This embodiment operates in a manner as described below.

Under the operation conditions C, the RGB data C output to the monitor 103-1 are corrected by the profile C modified in response to the user-selected setting information C and the ambient light information C.

To display the RGB data C on the monitor 103-2 under the operating conditions D, firstly the original data (the data before corrected by the profile C in response to the user-selected setting information C and the ambient light information C) are restored by means of the TRCC and the matrix C contained in the profile for the operating conditions C.

The restored data are then corrected by the profile D for the operating conditions D before output to the monitor 103-2.

With the above processing operation, it is now possible to make the two monitors 103-1 and 103-2 to display a same image in terms of colors, contrast and brightness if the monitors are actually a same monitor 103 and only the operating conditions (including the user-selected setting values and the viewing environment) are changed.

Figure 15:
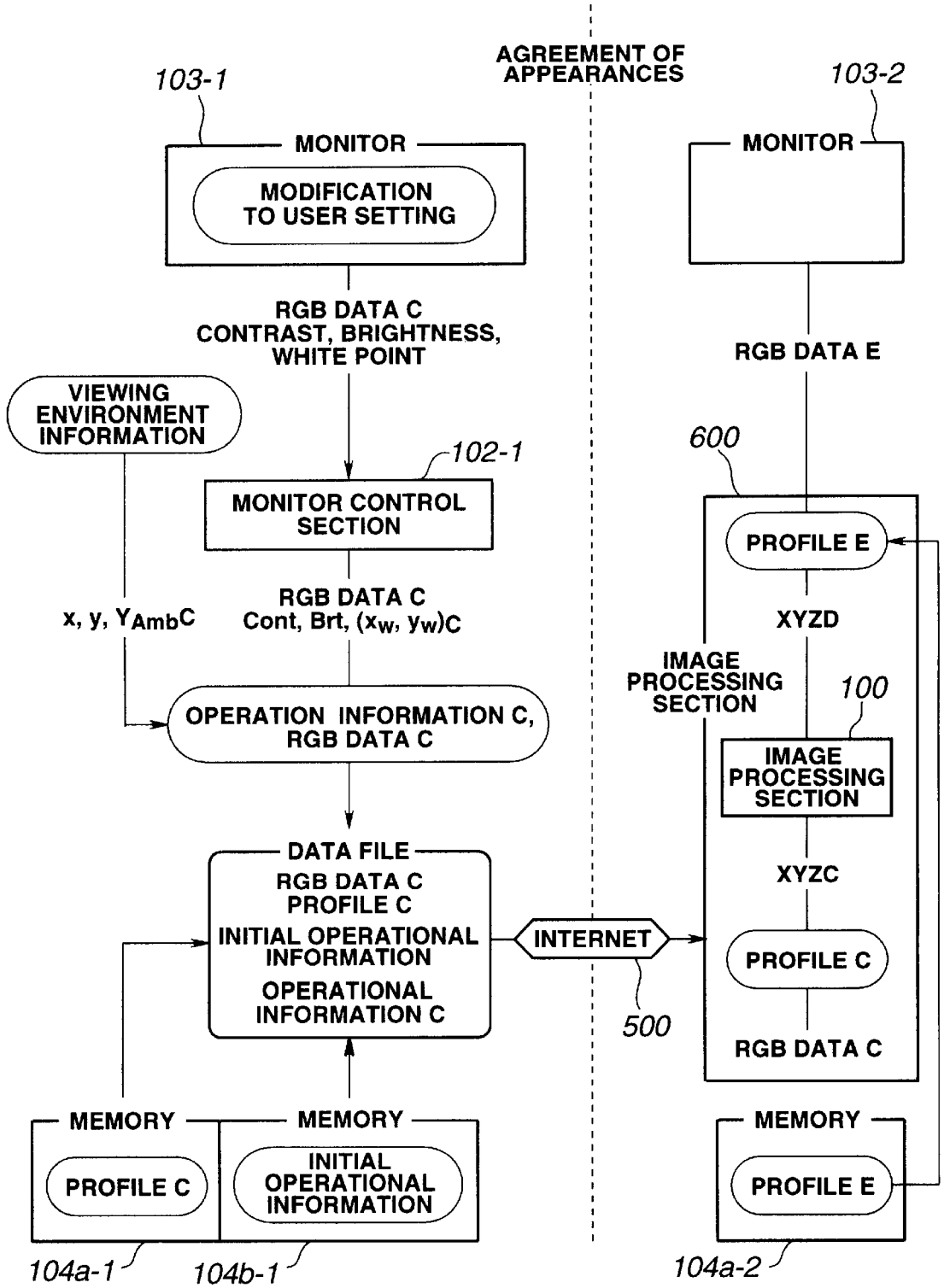
FIG. 15 is a schematic block diagram of still another embodiment of the invention, showing the configuration thereof.

FIG. 15 is a schematic block diagram of still another embodiment of the invention, showing the configuration thereof.

Note that, in FIG. 15, the components that are same as or similar to those of FIG. 8 are denoted respectively by the same reference symbols and will not be described any further.

This embodiment is so designed that the image displayed on monitor 103-1 is transferred to monitor 103-2 by way of internet 500 and displayed on the latter monitor.

The image processing section 600 comprises an image processing section 100 that receives the image transmitted by way of internet 500 and outputs the received image to the monitor 103-2 after carrying out predetermined processing operations on it.

This embodiment operates in a manner as described below.

The RGB data C displayed on the monitor 103-1 of the transmitter are transmitted to the receiver by way of internet 500 after the profile C stored in memory 104a-1, the information on the initial operating conditions (the operating conditions when the profile is generated) and the information C on the current operating conditions are added thereto by the monitor control section 102-1.

Since the monitor 103-1 of the transmitter is not provided with the functional feature of correcting the image data according to the operating conditions, the appearance of the colors of the image displayed on the monitor 103-1 is affected by the viewing environment and the setting of the monitor 103-1.

Then, the image processing section 600 of the receiver receives the information transmitted from the transmitter.

The image processing section 600 then extracts the profile C and the RGB data C from the transmitted information and performs an converting operation on the RGB data C by means of the obtained profile C to generate XYZC data.

The image processing section 100 carries out an operation of correcting the obtained XYZC data that reflects the operating conditions of the transmitter. More specifically, the image processing section 100 corrects the XYZC data by referring to the information on the initial operating conditions and the one on the operating conditions C. As a result, the XYZC data are converted to XYZD data that reflects the actual appearance of colors of the transmitter.

The obtained XYZD data are then converted to RGB data E by the profile E generated by the image processing section 100 to reflect the operating conditions E of the receiver and stored in the memory 104a-2 and then output to the monitor 103-2.

The above described embodiment is adapted to transmit the image displayed on the monitor 103-1 by way of the internet 500 and display it on the monitor 103-2. Thus, if the transmitter is not provided with a functional feature of correcting the profile according to the operating conditions, the image displayed on the transmitter and the one displayed on the receiver can be made to appear same and identical by transmitting the RGB data to which information on the operating conditions is added and correcting the transmitted data to reflect difference between the operating conditions of the transmitter and those of the receiver.

Now, if the monitor emits light if the input signals (dr, dg, db) shows values of (0, 0, 0) (which represents no substantive image data), the law of addition of colors (the sum of the 3-stimulus values of the individual colors of RGB #3-stimulus values when the three colors of RGB are emitted simultaneously) does not hold true. However, according to the invention, the colors can be calibrated accurately by minimally measuring the chromatic characteristics of the monitor. This function will be described in terms of two different occasions, when the law of proportion holds true for spectral distribution of light and when the law does not holds true.

When the law of proportion holds true for spectral distribution, the profile of spectral distribution ($L_{r,p}$, $L_{g,p}$, $L_{b,p}$) (P=λ) of the colors of RGB of the monitor is constant regardless of their intensities and equation (26) below applies.

$$L_{r,\lambda} = r \cdot L_{r,\lambda,max}$$

$$L_{g,\lambda} = g \cdot L_{g,\lambda,max}$$

$$L_{b,\lambda} = b \cdot L_{b,\lambda,max} \quad (26)$$

Then, if only the emission of red light is measurable or if the emission of light other than red light can be isolated from the measured value typically by means of a technique of principal component analysis, the XYZ3-stimulus values ($X_r$, $Y_r$, $Z_r$) are expressed by equations (27) below on the basis of the physical properties of the monitor.

$$X_r = X_{r,max}\left(k_{r,gain} \cdot \frac{dr}{2^N - 1} + k_{r,offset}\right)^{\gamma_r} \quad (27)$$

$$Y_r = Y_{r,max}\left(k_{r,gain} \cdot \frac{dr}{2^N - 1} + k_{r,offset}\right)^{\gamma_r}$$

$$Z_r = Z_{r,max}\left(k_{r,gain} \cdot \frac{dr}{2^N - 1} + k_{r,offset}\right)^{\gamma_r}$$

By normalizing the equations (27) by the maximum values of the 3-stimulus values ($X_{r,max}$, $Y_{r,max}$, $Z_{r,max}$), equations (28) are obtained.

$$r'(X) = \frac{X_r}{X_{r,max}} = \left(k_{r,gain} \cdot \frac{dr}{2^N - 1} + k_{r,offset}\right)^{\gamma_r} \quad (28)$$

$$r'(Y) = \frac{Y_r}{Y_{r,max}} = \left(k_{r,gain} \cdot \frac{dr}{2^N - 1} + k_{r,offset}\right)^{\gamma_r}$$

$$r'(Z) = \frac{Z_r}{Z_{r,max}} = \left(k_{r,gain} \cdot \frac{dr}{2^N - 1} + k_{r,offset}\right)^{\gamma_r}$$

As shown by equations (28), the formulas for the channel to be used for XYZ can alternatively be expressed by using a single formula. Note that equations (1) are realized by using the equation of r'(X) above. In the above equations, N represents the number of bits of the input signal and $\gamma_r$ represents the number to be used for the tone characteristics of red. While the equations of (28) are produced for red, similar expressions can be produced for green and blue. Thus, the formulas for the channel to be used for expressing the tone characteristics representing the relationship between the input digital signal (dr, dg, db) and the quantity of light for any of RGB can alternatively be expressed by means of a single formula. In other words, only a total of three formulas may be used for the three colors of RGB. Then, all the colors displayed on the monitor can be expressed in terms of CIE122-1996, using XYZ values ((X, Y, Z)$_{measured}$) and equation (29) below.

$$\begin{bmatrix} X \\ Y \\ Z \end{bmatrix}_{measured} = \begin{bmatrix} X_{r,max} & X_{g,max} & X_{b,max} \\ Y_{r,max} & Y_{g,max} & Y_{b,max} \\ Z_{r,max} & Z_{g,max} & Z_{b,max} \end{bmatrix} \begin{bmatrix} r' \\ g' \\ b' \end{bmatrix} \quad (29)$$

In the actual monitor, if the input signal is used only for a single color, it is difficult to accurately measure the emission of light of that color. In most cases, a slight emission of light of different colors will be picked up and measured due to the mutual effect of the channels and the regulated state of the black level. However, if the values of the RGB digital input signals of the monitor are (0, 0, 0), it is proved by experiments that the above theory holds true provided that the rate of light emission of the monitor is sufficiently low (and the black level is not isolated).

Nevertheless, once the user arbitrarily regulates the contrast and the brightness of the monitor to shift the black level, the monitor can emit light even (and the black level can become isolated) if the values of the RGB digital input signals of the monitor are (0, 0, 0). If such is the case, the offset coefficient $k_{offset}$ will take a positive value and the quantities of light of RGB (r', g', b') when the input signal values are (0, 0, 0) can be expressed by equations (30).

$$r' = (k_{r,offset})^{\gamma r}, \; g' = (k_{g,offset})^{\gamma g}, \; b' = (k_{b,offset})^{\gamma b} \quad (30)$$

Thus, the XYZ3-stimulus values $Y_{min}$, $Y_{min}$, $Z_{min}$) of the colors of RGB can be expressed by equations (31) for the black level.

$$\begin{cases} X_{r,min} = X_{r,max} \cdot k_{r,offset}^{\gamma r} \\ Y_{r,min} = Y_{r,max} \cdot k_{r,offset}^{\gamma r} \\ Z_{r,min} = Z_{r,max} \cdot k_{r,offset}^{\gamma r} \end{cases} \quad (31)$$

$$\begin{cases} X_{g,min} = X_{g,max} \cdot k_{g,offset}^{\gamma g} \\ Y_{g,min} = Y_{g,max} \cdot k_{g,offset}^{\gamma g} \\ Z_{g,min} = Z_{g,max} \cdot k_{g,offset}^{\gamma g} \end{cases}$$

$$\begin{cases} X_{b,min} = X_{b,max} \cdot k_{b,offset}^{\gamma b} \\ Y_{b,min} = Y_{b,max} \cdot k_{b,offset}^{\gamma b} \\ Z_{b,min} = Z_{b,max} \cdot k_{b,offset}^{\gamma b} \end{cases}$$

The XYZ3-stimulus values ($X_{k,min}$, $Y_{k,min}$, $Z_{k,min}$) of the black level can be expressed by equations (32) below.

$$\begin{cases} X_{k,min} = X_{r,min} + X_{g,min} + X_{b,min} \\ Y_{k,min} = Y_{r,min} + Y_{g,min} + Y_{b,min} \\ Z_{k,min} = Z_{r,min} + Z_{g,min} + Z_{b,min} \end{cases} \quad (32)$$

Taking light of the three colors into consideration, if an input signal is applied only to the red channel, the measured 3-stimulus values ($Y_{r,measured}$, $Y_{r,measured}$, $Z_{r,measured}$) will be expressed by equations (33). Equations (34) can be obtained by normalizing the equations (33).

$$X_{r,measured} = X_{r,max}\left(k_{r,gain} \cdot \frac{dr}{2^N-1} + k_{r,offset}\right)^{\gamma r} + X_{g,min} + X_{b,min} \quad (33)$$

$$Y_{r,measured} = Y_{r,max}\left(k_{r,gain} \cdot \frac{dr}{2^N-1} + k_{r,offset}\right)^{\gamma r} + Y_{g,min} + Y_{b,min}$$

$$Z_{r,measured} = Z_{r,max}\left(k_{r,gain} \cdot \frac{dr}{2^N-1} + k_{r,offset}\right)^{\gamma r} + Z_{g,min} + Z_{b,min}$$

$$r''(X) = \frac{X_{r,measured}}{X_{r,max}} = \quad (34)$$

$$\left(k_{r,gain} \cdot \frac{dr}{2^N-1} + k_{r,offset}\right)^{\gamma r} + \frac{X_{g,max}}{X_{r,max}}k_{g,offset}^{\gamma g} + \frac{X_{b,max}}{X_{r,max}}k_{r,offset}^{\gamma b}$$

$$r''(Y) = \frac{Y_{r,measured}}{Y_{r,max}} = \left(k_{r,gain} \cdot \frac{dr}{2^N-1} + k_{r,offset}\right)^{\gamma r} +$$

$$\frac{Y_{g,max}}{Y_{r,max}}k_{g,offset}^{\gamma g} + \frac{Y_{b,max}}{Y_{r,max}}k_{r,offset}^{\gamma r}$$

$$r''(Z) = \frac{Z_{r,measured}}{Z_{r,max}} = \left(k_{r,gain} \cdot \frac{dr}{2^N-1} + k_{r,offset}\right)^{\gamma r} +$$

$$\frac{Z_{g,max}}{Z_{r,max}}k_{g,offset}^{\gamma g} + \frac{Z_{b,max}}{Z_{r,max}}k_{b,offset}^{\gamma b}$$

In equations (34), the value of the offset terms (the rightest two terns of each of the equations (34)) differs for each of the channels of XYZ.

Now, equations (35) holds true.

$$X_{r,max} > X_{g,max}, X_{b,max}$$

$$Y_{g,max} > Y_{r,max}, Y_{b,max}$$

$$Z_{b,max} > Z_{r,max}, Z_{g,max} \quad (35)$$

Also, equations (36) holds true when the black level (0, 0, 0) is close to that of achromatic color.

$$(k_{r,offset})^{\gamma r} \approx (k_{g,offset})^{\gamma g} \approx (k_{b,offset})^{\gamma b} \quad (36)$$

Therefore, it will be seen that, in equations (34), the offset term of r"(X) (where the denominator $X_{r,max}$ has a large value) is smaller than the offset terms of r"(Y) and r"(Z) (where the numerators $Y_{g,max}$, $Z_{b,max}$ have a large value). This means that the TRC characteristics (tone characteristics) are different for each of the channels of XYZ so that three channels may be conceived for each of the RGB channels to produce a total of 9 TRCs. If such is the case, the XYZ3-stimulus values cannot be transformed by means of equation (37) of CIE122-1996 (same as equation (29) above) because no single TRC can be selected for each of r", g" and b".

$$\begin{bmatrix} X \\ Y \\ Z \end{bmatrix}_{measured} = \begin{bmatrix} X_{r,max} & X_{g,max} & X_{b,max} \\ Y_{r,max} & Y_{g,max} & Y_{b,max} \\ Z_{r,max} & Z_{g,max} & Z_{b,max} \end{bmatrix} \begin{bmatrix} r'' \\ g'' \\ b'' \end{bmatrix} \quad (37)$$

Therefore, equations (33) will be developed to produce equations (38)

$$X_{r,measured} = X_{r,max}\left(k_{r,gain} \cdot \frac{dr}{2^N - 1} + k_{r,offset}\right)^{\gamma_r} + X_{g,min} + X_{b,min}$$

$$= X_{r,max}\left(k_{r,gain} \cdot \frac{dr}{2^N - 1} + k_{r,offset}\right)^{\gamma_r} + (X_{r,min} + X_{g,min} + X_{b,min}) - X_{r,min}$$

$$= \left\{X_{r,max}\left(k_{r,gain} \cdot \frac{dr}{2^N - 1} + k_{r,offset}\right)^{\gamma_r} - X_{r,min}\right\} + X_{k,min}$$

$$Y_{r,measured} = Y_{r,max}\left(k_{r,gain} \cdot \frac{dr}{2^N - 1} + k_{r,offset}\right)^{\gamma_r} + Y_{g,min} + Y_{b,min}$$

$$= Y_{r,max}\left(k_{r,gain} \cdot \frac{dr}{2^N - 1} + k_{r,offset}\right)^{\gamma_r} + (Y_{r,min} + Y_{g,min} + Y_{b,min}) - Y_{r,min}$$

$$= \left\{Y_{r,max}\left(k_{r,gain} \cdot \frac{dr}{2^N - 1} + k_{r,offset}\right)^{\gamma_r} - Y_{r,min}\right\} + Y_{k,min}$$

$$Z_{r,measured} = Z_{r,max}\left(k_{r,gain} \cdot \frac{dr}{2^N - 1} + k_{r,offset}\right)^{\gamma_r} + Z_{g,min} + Z_{b,min}$$

$$= Z_{r,max}\left(k_{r,gain} \cdot \frac{dr}{2^N - 1} + k_{r,offset}\right)^{\gamma_r} + (Z_{r,min} + Z_{g,min} + Z_{b,min}) - Z_{r,min}$$

$$= \left\{Z_{r,max}\left(k_{r,gain} \cdot \frac{dr}{2^N - 1} + k_{r,offset}\right)^{\gamma_r} - Z_{r,min}\right\} + Z_{k,min}$$

(38)

Equations (38) can be transformed respectively into equations (39).

$$X_{r,measured} - X_{k,min} = X_{r,max}\left(k_{r,gain} \cdot \frac{dr}{2^N - 1} + k_{r,offset}\right)^{\gamma_r} - X_{r,min} \quad (39)$$

$$Y_{r,measured} - Y_{k,min} = Y_{r,max}\left(k_{r,gain} \cdot \frac{dr}{2^N - 1} + k_{r,offset}\right)^{\gamma_r} - Y_{r,min}$$

$$Z_{r,measured} - Z_{k,min} = Z_{r,max}\left(k_{r,gain} \cdot \frac{dr}{2^N - 1} + k_{r,offset}\right)^{\gamma_r} - Z_{r,min}$$

Then, equations (39) can be transformed respectively further into equations (40).

$$\frac{X_{r,measured} - X_{k,min}}{X_{r,max}} = \left(k_{r,gain} \cdot \frac{dr}{2^N - 1} + k_{r,offset}\right)^{\gamma_r} - \frac{X_{r,min}}{X_{r,max}} \quad (40)$$

$$\frac{Y_{r,measured} - Y_{k,min}}{Y_{r,max}} = \left(k_{r,gain} \cdot \frac{dr}{2^N - 1} + k_{r,offset}\right)^{\gamma_r} - \frac{Y_{r,min}}{Y_{r,max}}$$

$$\frac{Z_{r,measured} - Z_{k,min}}{Z_{r,max}} = \left(k_{r,gain} \cdot \frac{dr}{2^N - 1} + k_{r,offset}\right)^{\gamma_r} - \frac{Z_{r,min}}{Z_{r,max}}$$

Thus, equation (41) holds true.

$$\frac{X_{r,min}}{X_{r,max}} = \frac{Y_{r,min}}{Y_{r,max}} = \frac{Z_{r,min}}{Z_{r,max}} = k_{r,offset}{}^{\gamma_r} \quad (41)$$

If the value of equation (41) is $c_r$, equations (40) can be transcribed to equations (42).

$$\frac{X_{r,measured} - X_{k,min}}{X_{r,max}} = \left(k_{r,gain} \cdot \frac{dr}{2^N - 1} + k_{r,offset}\right)^{\gamma_r} - C_r \quad (42)$$

$$\frac{Y_{r,measured} - Y_{k,min}}{Y_{r,max}} = \left(k_{r,gain} \cdot \frac{dr}{2^N - 1} + k_{r,offset}\right)^{\gamma_r} - C_r$$

$$\frac{Z_{r,measured} - Z_{k,min}}{Z_{r,max}} = \left(k_{r,gain} \cdot \frac{dr}{2^N - 1} + k_{r,offset}\right)^{\gamma_r} - C_r$$

When the two sides of the equations (43) are multiplied by formulas (43) respectively so as to normalized them and make them take a value that is equal to 1 at maximum, equations (44) below will be obtained.

$$\frac{X_{r,max}}{X_{r,max} - X_{r,min}}, \frac{Y_{r,max}}{Y_{r,max} - Y_{r,min}}, \frac{Z_{r,max}}{Z_{r,max} - Z_{r,min}} \quad (43)$$

$$r'''(X) = \frac{X_{r,measured} - X_{k,min}}{X_{r,max} - X_{r,min}} \quad (44)$$

$$= \frac{X_{r,max}}{X_{r,max} - X_{r,min}}\left\{\left(k_{r,gain} \cdot \frac{dr}{2^N - 1} + k_{r,offset}\right)^{\gamma_r} - C_r\right\}$$

$$r'''(Y) = \frac{Y_{r,measured} - Y_{k,min}}{Y_{r,max} - Y_{r,min}}$$

$$= \frac{Y_{r,max}}{Y_{r,max} - Y_{r,min}}\left\{\left(k_{r,gain} \cdot \frac{dr}{2^N - 1} + k_{r,offset}\right)^{\gamma_r} - C_r\right\}$$

$$r'''(Z) = \frac{Z_{r,measured} - Z_{k,min}}{Z_{r,max} - Z_{r,min}}$$

$$= \frac{Z_{r,max}}{Z_{r,max} - Z_{r,min}}\left\{\left(k_{r,gain} \cdot \frac{dr}{2^N - 1} + k_{r,offset}\right)^{\gamma_r} - C_r\right\}$$

Thus, it will be seen that equation (45) below holds true.

$$\frac{X_{r,max}}{X_{r,max} - X_{r,min}} = \frac{Y_{r,max}}{Y_{r,max} - Y_{r,min}} = \frac{Z_{r,max}}{Z_{r,max} - Z_{r,min}} \quad (45)$$

Therefore, equations (44) can be transcribed to produce equations (46) below.

$$r'''(X) = \frac{X_{r,measured} - X_{k,min}}{X_{r,max} - X_{r,min}} = \left\{\left(k'_{r,gain} \cdot \frac{dr}{2^N - 1} + k'_{r,offset}\right)^{\gamma_r} - C'_r\right\} \quad (46)$$

$$r'''(Y) = \frac{Y_{r,measured} - Y_{k,min}}{Y_{r,max} - Y_{r,min}} = \left\{\left(k'_{r,gain} \cdot \frac{dr}{2^N - 1} + k'_{r,offset}\right)^{\gamma_r} - C'_r\right\}$$

$$r'''(Z) = \frac{Z_{r,measured} - Z_{k,min}}{Z_{r,max} - Z_{r,min}} = \left\{\left(k'_{r,gain} \cdot \frac{dr}{2^N - 1} + k'_{r,offset}\right)^{\gamma_r} - C'_r\right\}$$

As will be seen from the above equations, the TRCs of the channels of XYZ for red are expressed by an identical equation so that the TRC (tone) characteristics of the red channels can be expressed unequivocally by means of a GOGO model (which will be described hereinafter).

Thus, the TRCs for the channels of RGB are expressed by equations (47) below.

$$r''' = \frac{X_{r,measured} - X_{k,min}}{X_{r,max} - X_{g,min}} = \left\{ \left( k'_{r,gain} \cdot \frac{dr}{2^N - 1} + k'_{r,offset} \right)^{\gamma_r} - C'_r \right\} \quad (47)$$

$$g''' = \frac{Y_{g,measured} - Y_{k,min}}{Y_{g,max} - Y_{g,min}} = \left\{ \left( k'_{g,gain} \cdot \frac{dr}{2^N - 1} + k'_{g,offset} \right)^{\gamma_g} - C'_g \right\}$$

$$b''' = \frac{Z_{b,measured} - Z_{k,min}}{Z_{b,max} - Z_{b,min}} = \left\{ \left( k'_{b,gain} \cdot \frac{dr}{2^N - 1} + k'_{b,offset} \right)^{\gamma_b} - C'_b \right\}$$

Then, the conversion to XYZ3-stimulus values can be realized by means of matrix (48) below, using r''', g''' and b''' for expressing the quantities of light of RGB after correcting the non-linear characteristics by means of the TRCs:

$$\begin{bmatrix} X \\ Y \\ Z \end{bmatrix}_{measured} = \begin{bmatrix} X_{r,max} - X_{r,min} & X_{g,max} - X_{g,min} & X_{b,max} - X_{b,min} \\ Y_{r,max} - Y_{r,min} & Y_{g,max} - Y_{g,min} & Y_{b,max} - Y_{b,min} \\ Z_{r,max} - Z_{r,min} & Z_{g,max} - Z_{g,min} & Z_{b,max} - Z_{b,min} \end{bmatrix} \begin{bmatrix} r''' \\ g''' \\ b''' \end{bmatrix} + \begin{bmatrix} X_{k,min} \\ Y_{k,min} \\ Z_{k,min} \end{bmatrix} \quad (48)$$

$$= \begin{bmatrix} X_{r,max} - X_{r,min} & X_{g,max} - X_{g,min} & X_{b,max} - X_{b,min} & X_{k,min} \\ Y_{r,max} - Y_{r,min} & Y_{r,max} - Y_{r,min} & Y_{b,max} - Y_{b,min} & Y_{k,min} \\ Z_{r,max} - Z_{r,min} & Z_{g,max} - Z_{g,min} & Z_{b,max} - Z_{b,min} & Z_{k,min} \end{bmatrix} \begin{bmatrix} r''' \\ g''' \\ b''' \\ 1 \end{bmatrix}$$

where $$X_{r, max, measured} = X_{r, max} + X_{g, min} + X_{b, min}$$

$$X_{k, min} = X_{r, min} + X_{g, min} + X_{b, min} \quad (49)$$

therefore, equation (50) can be obtained.

$$X_{r, max} - X_{r, min} = X_{r, max, measured} - X_{k, min} \quad (50)$$

The above description can be applied also to green and blue. Thus, it is possible to ultimately realize the conversion to XYZ3-stimulus values by means of 3×4 matrix of (51) below.

$$\begin{bmatrix} X \\ Y \\ Z \end{bmatrix}_{measured} = \begin{bmatrix} X_{r,max,measured} - X_{k,min} & X_{g,max,measured} - X_{k,min} & X_{b,max,measured} - X_{k,min} X_{k,min} \\ Y_{r,max,measured} - Y_{k,min} & Y_{g,max,measured} - Y_{k,min} & Y_{b,max,measured} - Y_{k,min} Y_{k,min} \\ Z_{r,max,measured} - Z_{k,min} & Z_{g,max,measured} - Z_{k,min} & Z_{b,max,measured} - Z_{k,min} Z_{k,min} \end{bmatrix} \begin{bmatrix} r''' \\ g''' \\ b''' \\ 1 \end{bmatrix} \quad (51)$$

When the color reproduction characteristics of the monitor cannot be expressed accurately by means of the technique of CIE122-1996 or when the black level is isolated due to the setting of the monitor in terms of contrast and brightness, the TRC characteristics can be expressed by means of a GOGO model, using the tone data obtained by subtracting the measured values at the black level from the measured values for RGB in a manner as described above and also by means of the 3×4 conversion matrix obtained from four measurements of XYZ3-stimulus values for each of RGB when the input signals for RGB are maximal and of XYZ3-stimulus values at the black level (input signal=(0, 0, 0)) so that it is now possible to accurately calibrate the colors by measuring minimally the color characteristics of the monitor.

As described above, when the law of proportion holds true for spectral distribution of light, the tone characteristics of RGB can be expressed in terms of a total of three TRCs, one for each of RGB channels, using the data obtained by subtracting the data for the black level from the tone data for each of RGB in a manner as described above if the black level is isolated. However, in the case of a self-emission type display (that may be a CRT of a low cost model) where the law of proportion does not hold true for spectral distribution for any of RGB, or where equations (26) do not hold true, the above color calibration technique can give rise to large errors.

If such is the case, since equations (41) and (45) do not hold true in the process of deriving equations (46) from equations (33), the TRC for each of RGB cannot be determined unequivocally. Therefore, like equations (34) for red, the TRCs for green and blue obtained from the 3-stimulus values will be expressed by equations (52) below.

$$r''(X) = \frac{X_{r,measured}}{X_{r,measured,max}} \quad (52)$$

$$= \frac{X_{r,max}(k_{r,gain} \cdot dr/(2^N - 1) + k_{r,offset})^{\gamma_r} + X_{g,max}k_{g,offset}^{\gamma_g} + X_{b,max}k_{b,offset}^{\gamma_b}}{X_{r,measured,max}}$$

$$g''(X) = \frac{X_{g,measured}}{X_{g,measured,max}}$$

$$= \frac{X_{g,max}(k_{g,gain} \cdot dr/(2^N - 1) + k_{g,offset})^{\gamma_g} + X_{r,max}k_{r,offset}^{\gamma_r} + X_{b,max}k_{b,offset}^{\gamma_b}}{X_{g,measured,max}}$$

-continued $$b''(X) = \frac{X_{b,measured}}{X_{b,measured,max}}$$

$$= \frac{X_{b,max}(k_{b,gain} \cdot dr/(2^N - 1) + k_{b,offset})^{\gamma_b} + X_{r,max}k_{r,offset}^{\gamma_r} + X_{g,max}k_{g,offset}^{\gamma_g}}{X_{b,measured,max}}$$

The TRCs for Y and Z can be determined in a similar manner to produce a total of 9 TRCs, or 3 TRCs for each of the three primary colors. Assume now that the measured XYZ3-stimulus values are expressed by equations (53) below for any of the three colors.

$$X_{measured} = X_{r,max}\left(k_{r,gain} \cdot \frac{dr}{2^N - 1} + k_{r,offset}\right)^{\gamma_r} + \\ X_{g,max}\left(k_{g,gain} \cdot \frac{dr}{2^N - 1} + k_{g,offset}\right)^{\gamma_g} + \\ X_{b,max}\left(k_{b,gain} \cdot \frac{db}{2^N - 1} + k_{b,offset}\right)^{\gamma_b}$$

$$Y_{measured} = Y_{r,max}\left(k_{r,gain} \cdot \frac{dr}{2^N - 1} + k_{r,offset}\right)^{\gamma_r} + \\ Y_{g,max}\left(k_{g,gain} \cdot \frac{dr}{2^N - 1} + k_{g,offset}\right)^{\gamma_g} + \\ Y_{b,max}\left(k_{b,gain} \cdot \frac{db}{2^N - 1} + k_{b,offset}\right)^{\gamma_b}$$

$$Z_{measured} = Z_{r,max}\left(k_{r,gain} \cdot \frac{dr}{2^N - 1} + k_{r,offset}\right)^{\gamma_r} + \\ Z_{g,max}\left(k_{g,gain} \cdot \frac{dr}{2^N - 1} + k_{g,offset}\right)^{\gamma_g} + \\ Z_{b,max}\left(k_{b,gain} \cdot \frac{db}{2^N - 1} + k_{b,offset}\right)^{\gamma_b}$$

(53)

From equations (52), the equations of (53) can be modified to equations (54) below.

$$X_{measured} = X_{r,measured,max}r''(X) - (X_{g,max}k_{g,offset}^{\gamma_g} + X_{b,max}k_{b,offset}^{\gamma_b}) + \\ X_{g,measured,max}g''(X) - (X_{r,max}k_{r,offset}^{\gamma_r} + X_{b,max}k_{b,offset}^{\gamma_b}) + \\ X_{b,measured,max}b''(X) - (X_{r,max}k_{r,offset}^{\gamma_r} + X_{g,max}k_{g,offset}^{\gamma_g})$$

$$Y_{measured} = Y_{r,measured,max}r''(Y) - (Y_{g,max}K_{g,offset}^{\gamma_g} + Y_{b,max}k_{b,offset}^{\gamma_b}) + \\ Y_{g,measured,max}g''(Y) - (Y_{r,max}k_{r,offset}^{\gamma_r} + Y_{b,max}k_{b,offset}^{\gamma_b}) + \\ Y_{b,measured,max}b''(Y) - (Y_{r,max}k_{r,offset}^{\gamma_r} + Y_{g,max}k_{g,offset}^{\gamma_g})$$

$$Z_{measured} = Z_{r,measured,max}r''(Z) - (Z_{g,max}k_{g,offset}^{\gamma_g} + Z_{b,max}k_{b,offset}^{\gamma_b}) + \\ Z_{g,measured,max}g''(Z) - (Z_{r,max}k_{r,offset}^{\gamma_r} + Z_{b,max}k_{b,offset}^{\gamma_b}) + \\ Z_{b,measured,max}b''(Z) - (Z_{r,max}k_{r,offset}^{\gamma_r} + Z_{g,max}k_{g,offset}^{\gamma_g})$$

(54)

Additionally, equations of (54) can be modified to equations (55), using equations (31) and (32).

$$X_{measured} = X_{r,\ measured,\ max}r''(X) + X_{g,\ measured,\ max}g''(X) + X_{b,\ measured,\ max}b''(X) - 2X_{k,\ min}$$

$$Y_{measured} = Y_{r,\ measured,\ max}r''(Y) + Y_{g,\ measured,\ max}g''(Y) + Y_{b,\ measured,\ max}b''(Y) - 2Y_{k,\ min}$$

$$Z_{measured} = Z_{r,\ measured,\ max}r''(Z) + Z_{g,\ measured,\ max}g''(Z) + Z_{b,\ measured,\ max}b''(Z) - 2Z_{k,\ min}$$

(55)

Thus, for the purpose of color calibration of a self-emission type display where the law of proportion does no hold true for spectral distribution for any of RGB, the XYZ3-stimulus values can be determined not by means of matrix conversion using CIE122-1996 or equations (51) but from the nine TRCs and the 3-stimulus values for the black level.

Figure 16:
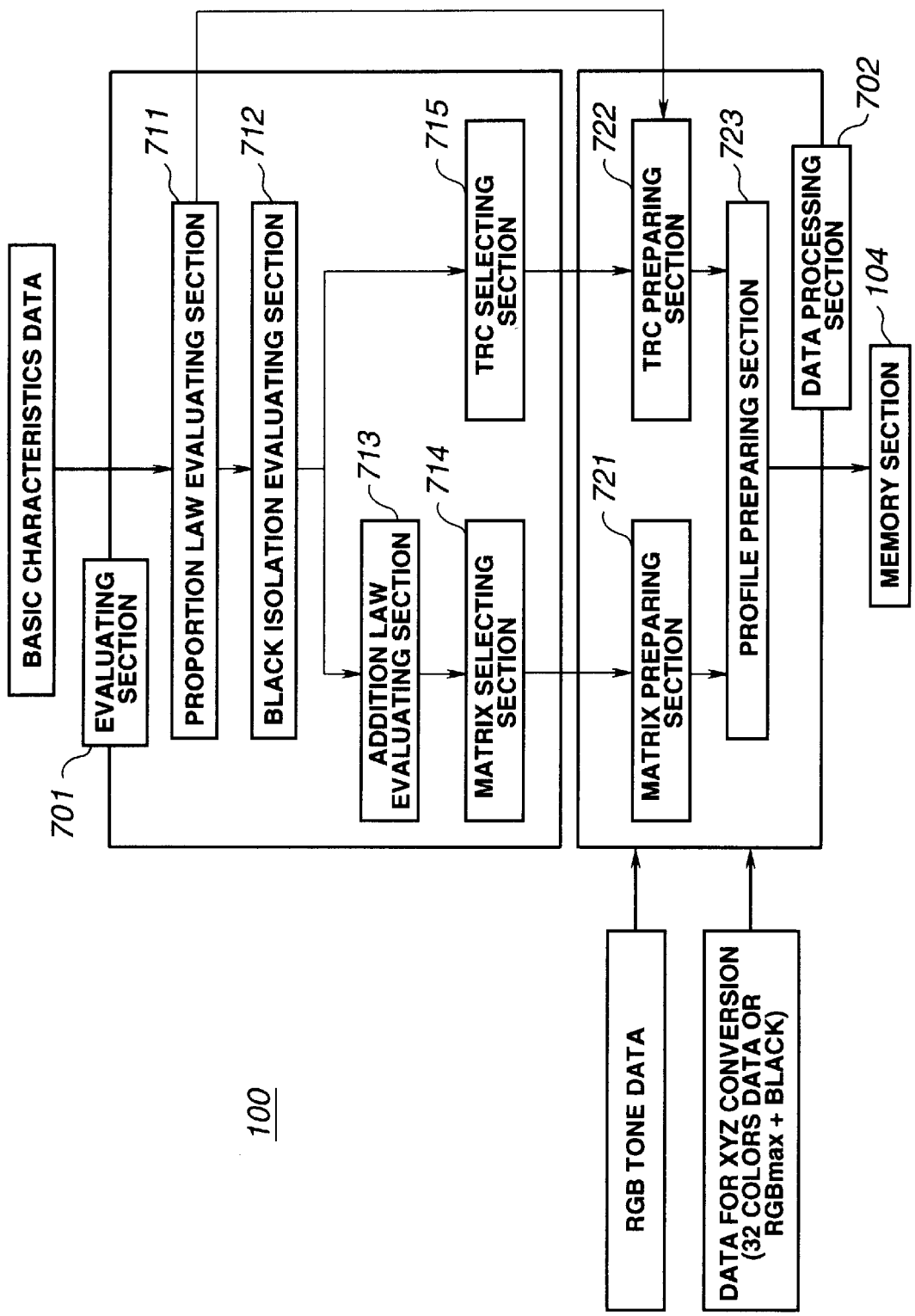
FIG. 16 is a schematic block diagram of still another embodiment of the invention, showing the configuration thereof.

FIG. 16 is a schematic block diagram of an embodiment of the invention comprising an image processing section 100 adapted to perform the above processing operations. In this embodiment, the image processing section 100 comprises an evaluating section 701 and a data processing section 702. The proportion law evaluating section 711 of the evaluating section 701 determines if the law of proportion holds true or not for spectral distribution of emitted light of RGB and outputs the outcome of the evaluation to the black isolation evaluating section 712 and the TRC preparing section 722 of the data processing section 702. The black isolation evaluating section 712 determines if the black level is isolated or not and outputs the outcome of the determining operation to the addition law evaluating section 713 and the TRC model selecting section 715.

The addition law evaluating section 713 determines if the law of addition holds true for mixing the colors of emitted light and outputs the outcome of the determining operation to the matrix selecting section 714. The matrix selecting section 714 selects the type of matrix for the purpose of conversion to XYZ values. The TRC model selecting section 715 selects a TRC model.

The matrix preparing section 721 of the data processing section 702 prepares a matrix for the purpose of conversion to XYZ values in response to selection of the matrix selecting section 714 and outputs the prepared matrix to the profile preparing section 723. The TRC preparing section 722 prepares TRCs for each of the channels for RGB in response to the selection of the TRC selecting section 715 and outputs the prepared TRCs to the profile preparing section 723. The profile preparing section 723 prepares an ICC profile and outputs it to the memory section 104.

Figure 17:
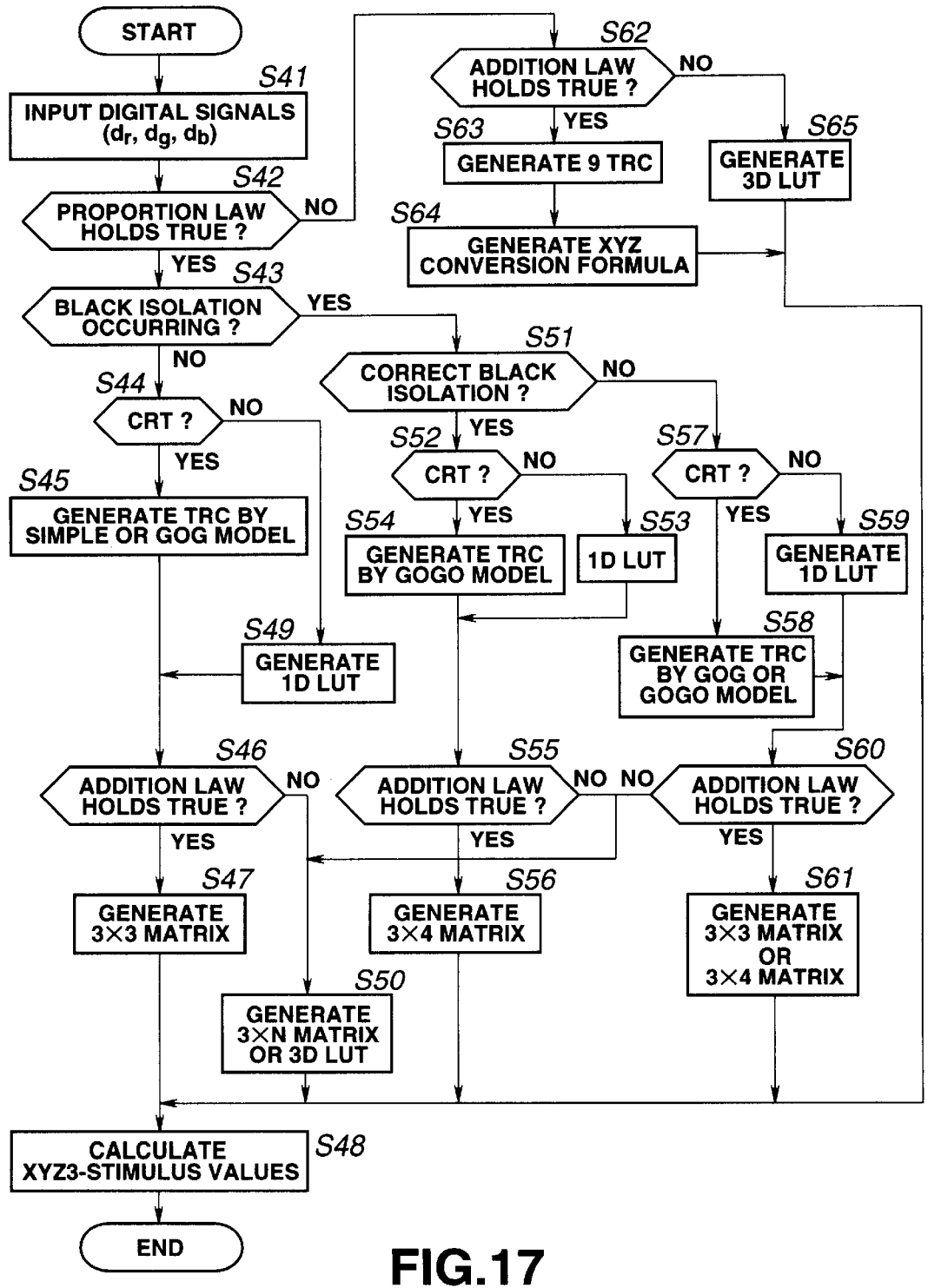
FIG. 17 is a flow chart, illustrating the operation of the embodiment of FIG. 16.

Now, the operation of the image processing section 100 will be discussed by referring to the flow chart of FIG. 17. Note that the processing operation of FIG. 17 is conducted for a self-emission type display. Firstly, in Step S41, the proportion law evaluating section 711 of the evaluating section 701 receives digital signals (dr, dg, db) as inputs. At this time, it also receives an identification code that indicates if the display is a CRT or not. In Step S42, the proportion law evaluating section 711 determines if the law of proportion holds true for spectral distribution of emitted light of RGB. In other words, it determines if the equations (26) above hold true or not. If the proportion law evaluating section 711 determines that the law of proportion holds true, it outputs the conclusion to the black isolation evaluating section 712.

Upon receiving the conclusion of the proportion law evaluating section 711 that the law of proportion holds true, the black isolation evaluating section 712 determines in Step S43 if a black isolation is there of not. In other words, it determines if the monitor emits light despite that the input digital signals (dr, dg, db) are (0, 0, 0) and there is (no image data) or the monitor does not emit light. If the black isolation evaluating section 712 determines that there is no black isolation, the operation proceeds to Step S44, where the TRC model selecting section 715 determines if the monitor is a CRT or not. If it determines that the monitor is a CRT, the operation proceeds to Step S45, where the TRC model selecting section 715 selects the simple model or the GOG model out of the models listed in Table 1 below that contains the simple model, the GOG (gain-offset-gamma) model and the GOGO (gain-offset-gamma-offset) model and outputs the outcome of its selection to the TRC preparing section 722.

TABLE 1

| No. | Name | Model Formula | Comment |
|---|---|---|---|
| 1 | Simple | $Y = X^\gamma$ | Simplest and widely use |
| 2 | GOG | $Y = (aX + b)^\gamma$ | Introduced in CIE tech.rep. 122–1996 |
| 3 | GOGO | $Y = (aX + b)^\gamma + c$ | Proposed in IEC/CD61966 part3 |

Now, each of the above models will be described briefly. As seen from Table 1, the simple model is used to generates a TRC according to the characteristics of $Y=X^P$ (P=γ) and has an advantage that the tone characteristics of the monitor is expressed only by a single index of power exponent, although it is frequently not satisfactorily accurate.

The GOG model is used in the CIE Technical Report CIE122-1996 and generates a TRC on the basis of equation $Y=(aX+b)^P$ (P=γ), where coefficient a represents the gain and coefficient b represents the offset. Since the GOG model is obtained from the physical properties of the CRT monitor, it can represent the tone characteristics of the monitor very well. However, it may no longer be able to represent the tone characteristics of the monitor when the user arbitrarily changes the setting of the monitor such as contrast and brightness and the black level of the monitor is consequently isolated.

The GOGO model is used to generates a TRC on the basis of equation $Y=(aX+b)^P+c$ (P=γ) obtained by adding an offset term c to the GOG model. The GOGO model is proposed in the last committee draft of IEC61966-3. The GOGO model can represents the tone characteristics of the monitor very well when the GOG cannot make an appropriate correction (as the black level of the monitor is isolated) because of the correcting effect of the offset term of c.

The TRC model selecting section 715 selects the simple model when the gain coefficient a is equal to 1 and the offset coefficient b is equal to 0. Otherwise, it selects the GOG model. When the GOG model is selected by the TRC model selecting section 715, the TRC preparing section 722 uses in Step S45 the data obtained by measuring the XYZ3-stimulus values of the numerical tone of each of the colors of RGB to determine the parameters of the GOG model and three TRCs by means of the non-linear optimization technique as seen from the flow chart of FIG. 18. Note that, although the flow chart of FIG. 18 shows the operation only for red, it equally applies to green and blue.

Figure 18:
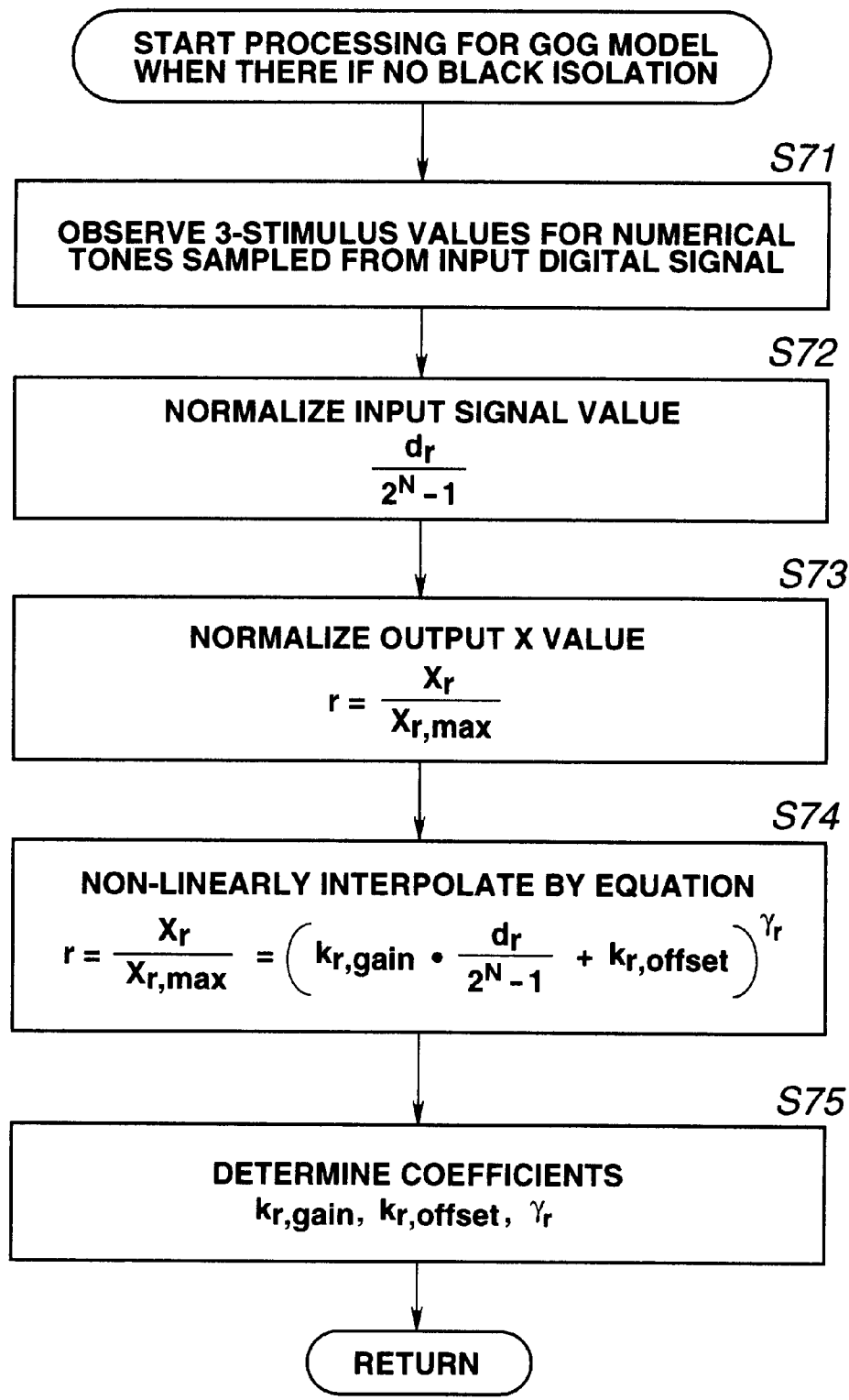
FIG. 18 is a flow chart for the processing operation of a GOG model when no isolated black exists.

Thus, referring to FIG. 18, in the first step of Step S71, 3-stimulus values are determined for the numerical tone by sampling input digital signal dr and, in Step S72, the input signal dr is normalized by dividing it by $2^N-1$. Then, in Step S73, the output value $X_r$ of the obtained 3-stimulus values is normalized by dividing it by maximum value of $X_{r,max}$ (which is also determined by measurement).

In Step S74, an operation of non-linear interpolation (non-linear optimization) is performed statistically according to the data on the input digital signal dr and the output value $X_r$ and equation (56) below. Then, in Step S75, the coefficients $k_{r,gain}$, $k_{r,offset}$ and $\gamma_r$ in equation (56) will be determined.

$$r = \frac{X_r}{X_{r,max}} \left( k_{r,gain} \cdot \frac{dr}{2^N - 1} + k_{r,offset} \right)^{\gamma_r} \quad (56)$$

Returning to FIG. 17, when it is determined in Step S44 that the monitor is not a CRT, the operation proceeds to Step S49, where the TRC preparing section 722 generates a total of three one-dimensional look-up tables (LUTs) for each of the channels for RGB between the quantities of light (r, g, b) obtained from the data on the XYZ3-stimulus values for the numerical tone of each of the colors of RGB and the input digital signals (dr, dg, db).

After the processing operation of Step S45 or Step S49, the operation proceeds to Step S46, where the addition law evaluating section 713 determines if the law of addition (for mixing colors) holds true or not. The law of addition is determined to hold true when the maximum brightness $Y_{Wmax}$ for white corresponds to a value between 95 percent and 105 percent of the sum of the maximum brightness values for RGB ($Y_{rmax}+Y_{gmax}+Y_{bmax}$). If it is determined in Step S46 that the law of addition holds true, the operation proceeds to Step S47, where the matrix selecting section 714 selects the 3×3 matrix shown in equation (2) and the matrix preparing section 721 actually prepares the matrix.

If it is determined that the law of addition does not hold true in Step S46, the operation proceeds to Step S50, where the user determines to generate either a 3×N matrix or a three-dimensional look-up table. Then, the matrix preparing section 721 actually prepares a 3×N matrix or a three-dimensional look up table between the quantities of light (r, g, b) for RGB and the XYZ3-stimulus values.

If, for example, it is determined that a 3×8 matrix is to be prepared, a 3×8 matrix for generating ($X_{CRT}$, $Y_{CRT}$, $Z_{CRT}$) will actually be generated on the basis of (r, g, b, l, rg, gb, br, rgb) as shown in equation (57) below.

$$\begin{bmatrix} X_{CRT} \\ Y_{CRT} \\ Z_{CRT} \end{bmatrix} = M_{3 \times 8} \begin{bmatrix} r \\ g \\ b \\ l \\ rg \\ gb \\ br \\ rbg \end{bmatrix} \quad (57)$$

Then, if it is determined in Step S43 that a black isolation exists, the operation proceeds to Step S51, where the user determines if the black isolation has to be corrected or not. If a black isolation exists only slightly and hence is hardly observable, it will be determined that the black isolation does not need to be corrected. If the black isolation is clearly observable, it will be determined that the black isolation needs to be corrected. Then, the processing operation proceeds to Step S52, where the TRC model selecting section 715 determines if the monitor is a CRT or not. If the monitor is a CRT, the operation proceeds to Step S54, where the TRC model selecting section 715 selects the GOGO model and the TRC preparing section 722 determines the parameters for the GOGO model by means of a non-linear optimization technique, using the data obtained by subtracting the XYZ3-stimulus values for input digital signals of (0, 0, 0) from the XYZ3-stimulus values for the numerical tone of each of the three colors of RGB and then also determines three TRCs as shown in equation (47).

Figure 19:
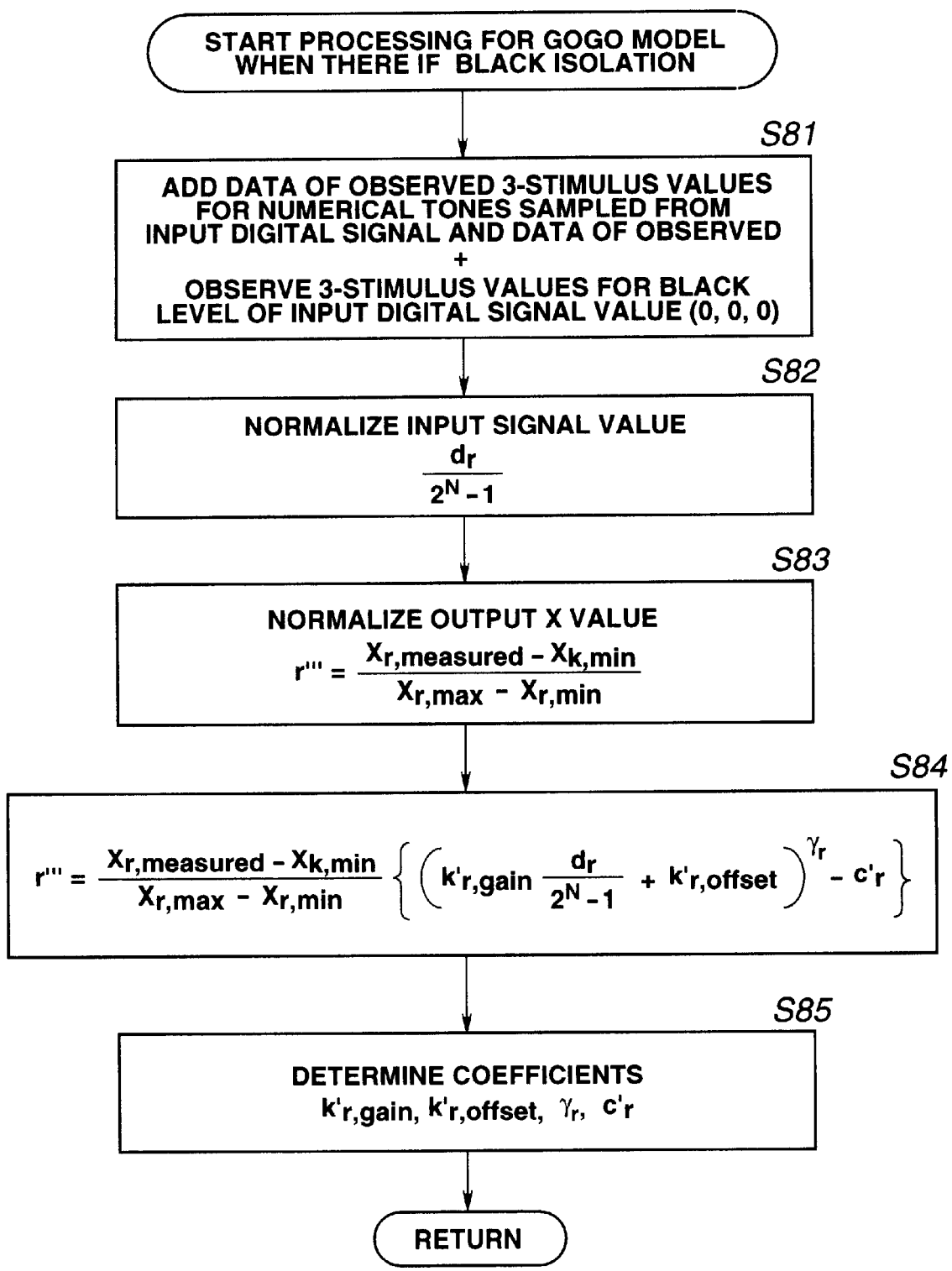
FIG. 19 is a flow chart for the processing operation of a GOGO model when isolated black exists.

FIG. 19 shows a flow chart that can be used for the operation of preparing TRCs by means of the GOGO model. Since Steps S81 through S85 are basically identical with the corresponding steps of FIG. 18, they will not be described in detail here, although the flow chart of FIG. 19 differs from that of FIG. 18 in that data are obtained by subtracting the XYZ3-stimulus values for input digital signals of (0, 0, 0) from the XYZ3-stimulus values for the numerical tone of each of the three colors of RGB in Step S81 and then used with equation (47) in Steps S83 and S84. Then, with the GOGO model, the offset term c' is determined in addition to $k'_{gain}$, $k'_{offset}$ and $\gamma'$.

After the processing operation of Step S54, the operation proceeds to Step S55, where the addition law evaluating section 713 determines if the law of addition holds true or not and, if the law holds true, the operation moves to Step S56, where the matrix selecting section 714 select a 3×4 matrix as expressed by equation of (51) above and the matrix preparing section 721 actually prepares the matrix from the four sets of data of the 3-stimulus values when the inputs for RGB are maximum and the XYZ3-stimulus values when the input digital signals are (0, 0, 0).

If it is determined by the TRC model selecting section 715 that the monitor is not a CRT in Step S52, the operation proceeds to Step S53, where the TRC preparing section 722 prepares a total of three one-dimensional look-up tables for each of the channels for RGB between the quantities of light (r''', g''', b''') obtained from the data obtained by subtracting the XYZ3-stimulus values for input digital signals of (0, 0, 0) from the XYZ3-stimulus values for the numerical tone of each of the three colors of RGB and the input digital signals (dr, dg, db). Thereafter, the operation proceeds to Step S55 and then to the subsequent steps.

If, on the other hand, that the law of addition does not hold true in Step S55, the operation moves to Step S50, where the matrix preparing section 721 uses the 3-stimulus values obtained by measuring several displayed colors of the monitor recommended by the IEC to generate coefficients for a 3×N matrix by linear recurrence or a three-dimensional look-up table between the quantities of light for RGB (r''', g''', b''') and the XYZ3-stimulus values.

If it is determined in Step S51 that the black isolation does not need correction, the operation proceeds to Step S57, where it is determined if the monitor is a CRT or not. If it is determined that the monitor is a CRT, the operation moves to Step S58, where the user selects either the GOG model or the GOGO model and the TRC preparing section 722 actually generates the selected model.

If, on the other hand, it is determined in Step S57 that the monitor is not a CRT, the operation moves to Step S59, where the TRC preparing section 722 generates one-dimensional look-up tables.

After the processing operation of Step S58 or Step S59, in Step S60, the addition law evaluating section 713 determines if the law of addition holds true or no and, if the law of addition holds true, the user selects either generation of a 3×3 matrix or that of a 3×4 matrix in Step S61 so that the matrix preparing section 721 prepares the requested matrix by linear recurrence from the measured XYZ values for the 32 colors of the IEC. If, on the other hand, it is determined in Step S60 that the law of addition does not hold true, the operation moves to Step S50, where a 3×N matrix or a three-dimensional look-up table will be generated.

If it is determined in Step S42 that the law of proportion does not holds true, the operation proceeds to Step S62, where the addition law evaluating section 713 determines if the law of addition holds true or not. If it is determined that the law of addition does not hold true, the operation proceeds to Step S65, where the TRC preparing section 722 prepares a three-dimensional look-up table between the quantities of light for RGB (r, g, b) and the XYZ3-stimulus values. If, on the other hand, it is determined in Step S62 that the law of addition holds true, the operation proceeds to Step S63, where the TRC preparing section 722 determines the GOGO parameters from the measured XYZ3-stimulus values for each of the RGB by means of the non-linear optimization technique and prepares a total of nine TRCs including three TRCs for the three X values obtained by equations (52), three TRCs for the three Y values and three TRCs for the three Z values, while the profile preparing section 723 generates modified equations for XYZ as shown in (55).

After the processing operations in Steps S47, S50, S56, S61, S64 and S65, in Step S48, the profile preparing section 723 processes the XYZ3-stimulus values.

Thus, if the black level of the monitor is isolated as a result of that the user arbitrarily modifies the contrast and the brightness of the monitor, the colors of the monitor can be calibrated accurately without increasing the number of measurements for evaluating the color reproduction characteristics of the monitor.

Note that the operation of generating a 3×4 matrix using the equation of (51) may be replaced by an operation of generating a 3×3 matrix using the equation of (58) as shown below, converting the values of (r''', g''', b''') representing the quantities of light that are non-linearly corrected by the TRCs by means of the 3×3 matrix and then adding the XYZ3-stimulus values for the digital signals of (0, 0, 0).

$$\begin{bmatrix} X \\ Y \\ Z \end{bmatrix}_{measured} = \begin{bmatrix} X_{r,measured} - X_{k,min} & X_{g,measured} - X_{k,min} & X_{b,measured} - X_{k,min} \\ Y_{r,measured} - Y_{k,min} & Y_{g,measured} - Y_{k,min} & Y_{b,measured} - Y_{k,min} \\ Z_{r,measured} - Z_{k,min} & Z_{g,measured} - Z_{k,min} & Z_{b,measured} - Z_{k,min} \end{bmatrix}_{Regression} \begin{bmatrix} r \\ g \\ b \end{bmatrix} + \begin{bmatrix} X_{k,min} \\ Y_{k,min} \\ Z_{k,min} \end{bmatrix} \quad (58)$$

Note that the media that can be used to transmit the computer program for the above processing operation include recording media such as magnetic discs, CD-ROMs and solid memories as well as communication media such as communication networks and satellites.

INDUSTRIAL APPLICABILITY

The present invention can provide an apparatus and a method for processing images as well as a providing medium that are adapted to properly correct the colors of images.

Additionally, the present invention can provide an apparatus and a method for processing images as well as a providing medium that are adapted to automatically update the chromatic profile of a monitor for color matching.

Still additionally, the present invention can provide a system and a method for transmitting/receiving images as well as a providing medium that are adapted to make the appearance of the image at the transmitter agree with that of the image at the receiver in terms of colors.

Still additionally, the present invention can also provide an apparatus and a method for processing images as well as a providing medium that are adapted to accurately calibrate the chromatic profile of a monitor with a minimal amount of data obtained by measurement if the black level is isolated.

Furthermore, the present invention can provide an apparatus and a method for processing images as well as a providing medium that are adapted to accurately carry out an operation of chromatic calibration with a minimal amount of data obtained by measurement.

What is claimed is:

1. An image transmission/reception system for transmitting image data input by the input device of a transmitter to the device of a receiver, performing predetermined processing operations on said data by means of the device of said receiver and outputting said data to an output device, characterized in that: said device of said transmitter comprises:

first memory means for storing the (chromatic) profiles of said input device;

second memory means for storing the initial operating information obtained when said profiles are prepared;

input means for inputting the current operating information of said input device;

adding means for adding said profiles, said initial operating information and said current operating information to the image data input by said input device; and transmission means for transmitting said image data with information added thereto by said adding means to said device of said receiver; whereas said device of said receiver comprises:

reception means for receiving the image data transmitted by said transmission means;

extraction means for extracting said profiles, said initial operating information and said current operating information from said image data received by said reception means; and correcting means for correcting said image data according to said profiles, said initial operating information and said current operating information extracted by said extraction means.

2. An image transmission/reception method of an image transmission/reception system for transmitting image data input by the input device of a transmitter to the device of a receiver, performing predetermined processing operations on said data by means of the device of said receiver and outputting said data to an output device, characterized in that: said transmission method comprises:

a first step of storing the (chromatic) profiles of said input device;

a second step of storing the initial operating information obtained when said profiles are prepared;

an input step for inputting the current operating information of said input device;

an adding step of adding said profiles, said initial operating information and said current operating information to the image data input by said input device; and a transmitting step of transmitting said image data with information added thereto by said adding means to said device of said receiver; whereas said reception method comprises:

a receiving step of receiving the image data transmitted by said transmission means;

an extracting step of extracting said profiles, said initial operating information and said current operating information from said image data received by said reception means; and a correcting step of correcting said image data according to said profiles, said initial operating information and said current operating information extracted by said extraction means.

3. A providing medium, characterized by providing an image transmission/reception system for transmitting image data input by the input device of a transmitter to the device of a receiver, performing predetermined processing operations on said data by means of the device of said receiver and outputting said data to an output device with a computer-readable program for causing: said device of said transmitter to carry out a processing operation comprising:

a first step of storing the (chromatic) profiles of said input device;

a second step of storing the initial operating information obtained when said profiles are prepared;

an input step for inputting the current operating information of said input device;

an adding step of adding said profiles, said initial operating information and said current operating information to the image data input by said input device; and a transmitting step of transmitting said image data with information added thereto by said adding means to said device of said receiver; whereas said device of said receiver to carry out a processing operation comprising steps of:

a receiving step of receiving the image data transmitted by said transmission means;

an extraction step of extracting said profiles, said initial operating information and said current operating information from said image data received by said reception means; and a correcting step of correcting said image data according to said profiles, said initial operating information and said current operating information extracted by said extraction means.

4. An image processing apparatus adapted to cause a display section having three primary colors to display images corresponding to image data, characterized by comprising:

first detection means for detecting any emission of light of said display section in a state where no image data is applied thereto;

second detection means for detecting if the law of addition for mixing colors holds true or not; and generation means for generating a 3×4 matrix for obtaining device-independent color signals including signal elements for offsetting the emission of light, if any, in a state where no image data is applied to the display section, in response to the outcome of detection of said first detection means and that of said second detection means;

whereby the second detection means detects that the law of addition holds true when a detected maximum brightness for white corresponds, within a predetermined tolerance, to the sum of the maximum brightness values for the three primary colors of the display section.

5. An image processing apparatus according to claim 4, characterized in that:
said 3×4 matrix is a matrix for obtaining XYZ3-stimulus values from the data obtained by means of tone reproduction curves.

6. An image processing method to be used for an image processing apparatus adapted to cause a display section having three primary colors to display images corresponding to image data, characterized by comprising:
detecting any emission of light of said display section in a state where no image data is applied thereto;
detecting if the law of addition for mixing colors holds true or not; and
generating a 3×4 matrix for obtaining device-independent color signals including signal elements for offsetting the emission of light, if any, in a state where no image data is applied to the display section, in response to the outcome of said light emission detecting and said law of addition detecting;
whereby the law of addition is detected to hold true when a detected maximum brightness for white corresponds, within a predetermined tolerance, to the sum of the maximum brightness values for the three primary colors of the display section.

7. A providing medium characterized by providing an image processing apparatus adapted to cause a display section having three primary colors to display images corresponding to image data with a computer-readable program for causing said apparatus to perform a processing operation comprising:
detecting any emission of light of said display section in a state where no image data is applied thereto;
detecting if the law of addition for mixing colors holds true or not; and
generating a 3×4 matrix for obtaining device-independent color signals including signal elements for offsetting the emission of light, if any, in a state where no image data is applied to the display section, in response to the outcome of said light emission detecting and said law of addition detecting;
whereby the law of addition is detected to hold true when a detected maximum brightness for white corresponds, within a predetermined tolerance, to the sum of the maximum brightness values for the three primary colors of the display section.

8. An image processing apparatus adapted to cause a display section to display images corresponding to image data, characterized by comprising:
detection means for detecting if the law of proportion for spectral distribution holds true or not;
first generation means for generating nine tone reproduction curves in response to the outcome of detection of said detection means; and
second generation means for generating formulas for obtaining device-independent color signals from said nine tone reproduction curves generated by said first generation means and the 3-stimulus values for the black level;
wherein said images are displayed on said display section based on said device-independent color signals;
whereby the law of proportion is detected to hold true when the profile of spectral distribution of the colors of RGB of the image processing apparatus is detected to be constant regardless of their intensities.

9. An image processing method to be used for an image processing apparatus adapted to cause a display section to display images corresponding to image data, characterized by comprising:
detecting if the law of proportion for spectral distribution holds true or not;
generating nine tone reproduction curves in response to the outcome of detection of said detection step;
generating formulas for obtaining device-independent color signals from said nine tone reproduction curves generated in said first generation step and the 3-stimulus values for the black level; and
displaying images on said display section based on said device-independent color signals;
whereby the law of proportion is detected to hold true when the profile of spectral distribution of the colors of RGB of the image processing apparatus is detected to be constant regardless of their intensities.

10. A providing medium characterized by providing an image processing apparatus adapted to cause a display section to display images corresponding to image data with a computer-readable program for causing said apparatus to perform a processing operation comprising:
detecting if the law of proportion for spectral distribution holds true or not;
generating nine tone reproduction curves in response to the outcome of detection of said detection step;
generating formulas for obtaining device-independent color signals from said nine tone reproduction curves generated in said first generation step and the 3-stimulus values for the black level; and
displaying images on said display section based on said device-independent color signals;
whereby the law of proportion is detected to hold true when the profile of spectral distribution of the colors of RGB of the image processing apparatus is detected to be constant regardless of their intensities.

11. An image processing apparatus adapted to modify images signals to be output to a monitor by means of (chromatic) profiles reflecting the (chromatic) characteristics of said monitor, characterized by comprising:
input means for acquiring input setting information of said monitor, said setting information indicating the reference white point of said monitor;
updating means for updating said profiles according to said input setting information, wherein said updating means modifies a tone reproduction curve and matrices of said profiles according to said information indicating the reference white point; and
storing means for storing said profiles updated by said updating means.

12. An image processing method for modifying image signals to be output to a monitor by means of (chromatic) profiles reflecting the (chromatic) characteristics of said monitor, characterized by comprising the steps of:
acquiring input setting information indicating a setting of said monitor;
updating said profiles according to said setting information input in said input step; and storing said profiles updated by said updating step, wherein,
said setting information is information indicating the contrast or the brightness of the image to be output to said monitor; and
said updating comprises modifying tone reproduction curves of said profiles according to said contrast or brightness information.

13. A providing medium characterized by providing an image processing apparatus adapted to modify image signals to be output to a monitor by means of (chromatic) profiles reflecting the (chromatic) characteristics of said monitor with a computer-readable program for causing said apparatus to perform a processing operation comprising steps of:

acquiring input setting information indicating a setting of said monitor;

updating said profiles according to said setting information input in said input step; and storing said profiles updated by said updating step; wherein, said setting information is information indicating the contrast or the brightness of the image to be output to said monitor; and said updating comprises modifying tone reproduction curves of said profiles according to said contrast or brightness information.

14. An image processing apparatus according to claim 4 wherein said three primary colors are red, green and blue.

15. An image processing apparatus according to claim 4 wherein said predetermined tolerance is between 95 and 105 percent of the sum of the maximum brightness values for the three primary colors.

* * * * *